(12) United States Patent
Swarts

(10) Patent No.: US 8,616,241 B2
(45) Date of Patent: Dec. 31, 2013

(54) WASTE EVACUATION SYSTEM FOR A VEHICLE

(76) Inventor: Douglas R. Swarts, Hollister, CA (US)

( * ) Notice: Subject to any disclaimer, the term of this patent is extended or adjusted under 35 U.S.C. 154(b) by 2147 days.

(21) Appl. No.: 10/693,719

(22) Filed: Oct. 24, 2003

(65) Prior Publication Data
US 2004/0084098 A1 May 6, 2004

Related U.S. Application Data

(60) Provisional application No. 60/422,406, filed on Oct. 29, 2002.

(51) Int. Cl.
*F16K 27/12* (2006.01)

(52) U.S. Cl.
USPC .................. 137/899; 137/355.12; 137/355.16

(58) Field of Classification Search
USPC ......... 137/355.12, 355.16, 899; 4/323; 92/34; 417/65, 151
See application file for complete search history.

(56) References Cited

U.S. PATENT DOCUMENTS

| | | | |
|---|---|---|---|
| 2,346,728 A | 4/1944 | Carlson | |
| 2,514,059 A | 7/1950 | Hicks et al. | |
| 2,852,216 A | 9/1958 | Peters | |
| 3,467,301 A | 9/1969 | Doyle et al. | |
| 3,623,500 A | 11/1971 | Hoy | |
| 3,712,331 A | 1/1973 | Otto | |
| 3,730,228 A | 5/1973 | Gibbs, Sr. | |
| 3,811,462 A | 5/1974 | Feliz | |
| 3,882,565 A | 5/1975 | Irwin et al. | |
| 3,958,297 A | 5/1976 | Hukuba et al. | |
| 4,133,347 A | 1/1979 | Mercer | |
| 4,180,102 A | 12/1979 | Larkin | |
| 4,223,702 A | 9/1980 | Cook | |
| 4,231,595 A | 11/1980 | Knutsen | |
| 4,650,224 A | 3/1987 | Smith | |
| 4,779,650 A | 10/1988 | Sargent et al. | |
| 4,796,926 A | 1/1989 | Rapsilver | |
| 4,854,349 A | 8/1989 | Foreman | |
| 5,023,959 A | 6/1991 | Mercer | |
| 5,078,180 A | 1/1992 | Collins | |
| 5,244,003 A | 9/1993 | Boomgaarden | |
| 5,247,974 A | 9/1993 | Sargent et al. | |
| 5,636,648 A | 6/1997 | O'Brien et al. | |
| 5,653,262 A | 8/1997 | Hanemaayer | |
| 5,697,285 A | 12/1997 | Nappi et al. | |
| 5,816,639 A | 10/1998 | DiBiagio et al. | |
| 5,823,869 A | 10/1998 | Paturzo | |
| 5,904,183 A | 5/1999 | Leech | |
| 5,951,082 A | 9/1999 | DiBiagio et al. | |
| 5,988,221 A * | 11/1999 | Walker | 137/899 |
| 6,024,134 A | 2/2000 | Akedo et al. | |
| 6,224,345 B1 * | 5/2001 | Dussault | 417/138 |
| 6,607,009 B2 | 8/2003 | Schoellhorn et al. | |
| 2002/0079017 A1 | 6/2002 | Fields | |

OTHER PUBLICATIONS

Arizona Vortex Tube Manufacturing Company, Title "Vortex Air Amplifiers", from http://www.arizoniavortex.com/airamplifiers.htm, Aug. 25, 2003, 2 pages, Sedoma, AZ USA.

(Continued)

*Primary Examiner* — John Fox
(74) *Attorney, Agent, or Firm* — Heimlich Law, PC; Alan Heimlich, Esq.

(57) ABSTRACT

A waste evacuation system for a vehicle having an extendible and retractable hose for transferring the waste has been described.

24 Claims, 41 Drawing Sheets

(56) References Cited

OTHER PUBLICATIONS

Exair Corp., Title "Air Amplifiers", from http://www.exair.com/airamplifier/aa_page.htm, Aug. 6, 2003, 4 pages, Cincinnati, OH USA.

Exair Corp., Title "Line Vac", from http://www.exair.com/linevac/lv_page.htm, Aug. 6, 2003, 7 pages, Cincinnati, OH USA.

Fox Valve Development Corp., Title "Applications of Fox Venturi Eductors Case Study No. 31", from http://www.foxvalve.com/pdf/case_studies/Fox_cs31.pdf, Aug. 2003, 2 pgs. Dover, NJ USA.

Richard Lindstom, M.D., "Advances in Opthalmic Technology", Nov. 12, 2001, 3 pgs, Staar Surgical 2001 AAO Education Program, STAAR Surgical Company Monrovia, CA USA.

Zicom Group, "Air Pumps, Dragin Pump, BV22 & BV11", from http://www.zicom.com.sg/html/blovac.html, Aug. 5, 2003, 2 pgs, Singapore.

* cited by examiner

Checklist Comparison

Standard Approach

- Remove RV Dump Cap
- Connect Sewer Hose to RV
- Conn ct Hose to Sewer
- Open Black Water Valve
- Flush Black Water Tank
- Close Black Water Tank
- Open Gray Water Tank
- Flush Gray Water Tank
- Close Gray Water Tank
- Disconnect Hose From RV
- Rinse Hose with Fresh Water
- Elevate and Drain Sewer Hose
- Disconnect Hose from Sewer
- Rinse Sewer End of Hose
- Rinse Dump Apron Area
- Stow Sewer Hose
- Place Additive in Black Water Tank via Stool

Invention Approach

- Open Hose Nozzle Hatch
- Pull Hose Nozzle and Place in Sewer
- Release Latch on Hose Nozzle
- Activate Dumping
- Close Latch on Hose Nozzle
- Remove Hose Nozzle from Sewer
- Retract Hose
- Close Hose Nozzle Hatch
- Button Activates Drain Master Additive Injection System Adding Measured Quantity of Tank Additive to Black water and Gray Water Tanks

WASTE EVACUATION SYSTEM FOR A VEHICLE

RELATED APPLICATION

This patent application claims priority of U.S. Provisional Application Ser. No. 60/422,406 filed Oct. 29, 2002 titled "Method and Apparatus for Waste Evacuation", which is hereby incorporated herein by reference. This patent application is related to a co-pending application Ser. No. 10/693,780, filed on Oct. 24, 2003 titled "Method and Apparatus for Waste Evacuation" by the same inventor as this application and assigned to the same assignee.

FIELD OF THE INVENTION

The present invention pertains to waste evacuation. More particularly, the present invention relates to a waste evacuation system for vehicle.

BACKGROUND OF THE INVENTION

Most mobile vehicles (hereinafter referred to sometimes as Recreational Vehicles (RVs)) today have the ability to be connected to ground connections, electric power, water, sewer, cable TV, telephone, etc. An unpleasant task is interfacing the sewer connections. The standard accepted practice is to manually remove a sewer hose from a storage compartment, connect it to the RV then stretch the hose end to a connection where the hose is inserted into a hole or a fitting that is connected to a container for receiving the sewage.

This approach may be very unsanitary and unpleasant as well as an invitation to a disaster, i.e. hose coming loose, connection failure, valve breaking, etc. which may result in the user getting wet, the campground becoming contaminated, and embarrassment for all. This presents a problem.

BRIEF DESCRIPTION OF THE DRAWINGS

The present invention is illustrated by way of example and not limitation in the figures of the accompanying drawings, in which like references indicate similar elements and in which:

FIG. 3 is a comparison of a standard approach with that of one embodiment of the invention;

DETAILED DESCRIPTION

Figure 1:
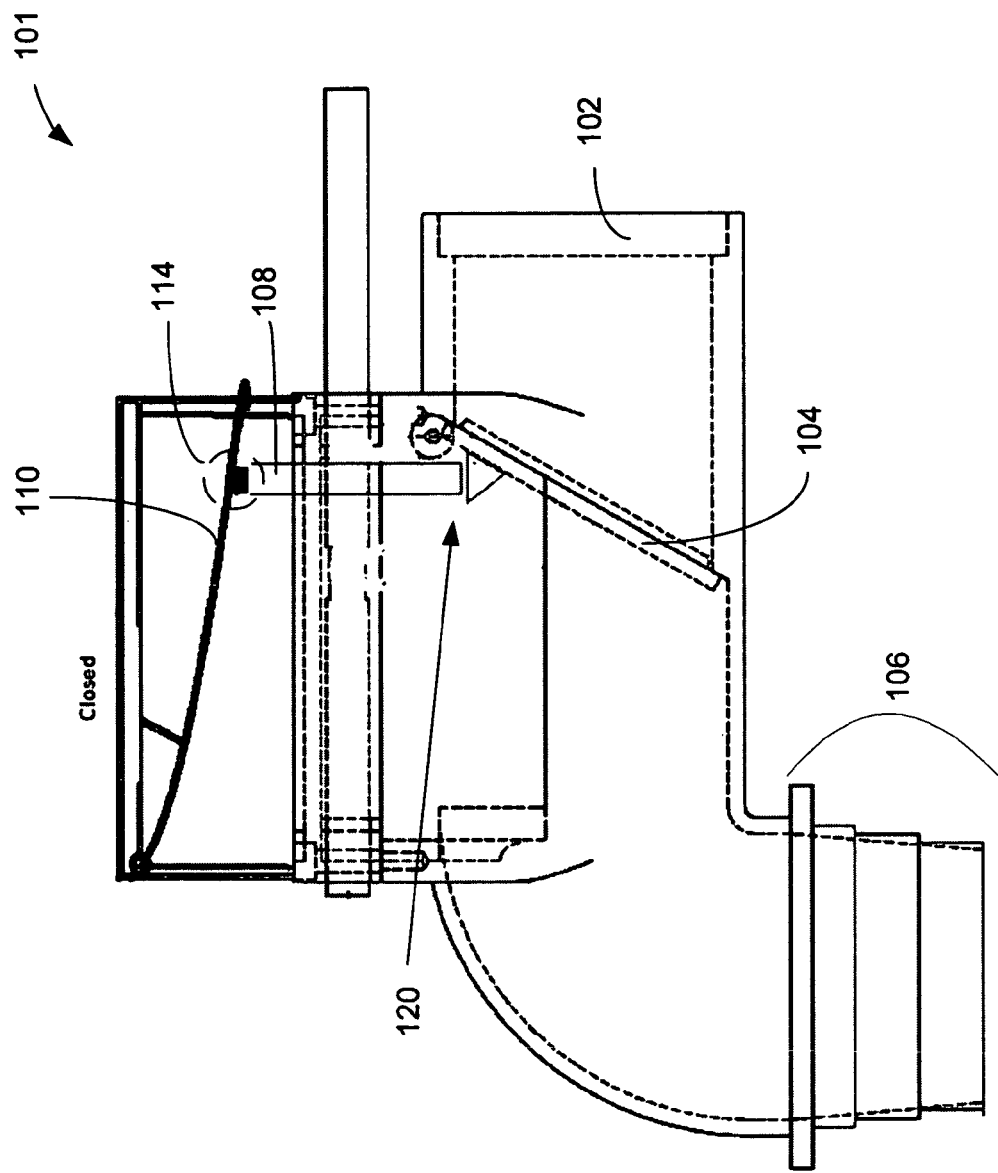
FIG. 1, and FIG. 2 illustrate views of one embodiment of the invention with a flapper door in a closed and locked position and a position in which it may open.

A waste evacuation system for a vehicle is described.

The invention in one embodiment may help eliminate some problems associated with transferring waste from a RV to a ground waste facility. Components are arranged in a special enclosure, for example a service bay, located under the living floor of the RV. The sewer hose is connected to the RV and stored in a separate tube or area isolated from other components. A special hose nozzle is attached to the other end of the hose. The user opens a small door, lifts the nozzle by a handle, and pulls the hose nozzle to the ground connection, inserts the nozzle and releases a nozzle flap door inside. By pushing a couple of buttons, or pulling a waste valve handle, the waste is transferred from the RV holding tanks to the ground service. When completed the hose nozzle flap door is secured, the nozzle lifted out of the ground connection and the hose is retracted back into its storage tube.

One skilled in the art will appreciate that such an embodiment as described above has several features, such as, simplicity of connecting to ground facilities, the sewer hose may be connected to the RV at all times, a sewer hose may retract and expand linearly (i.e. a linear reel) and that no additional fittings or handling of fittings may be needed while expanding the hose to and contracting the hose from a ground connection. The hose may be expanded by air pressure and contracted by vacuum, and may allow for easier emptying of the holding tanks. The sewer hose may also be extended and retracted in a manual fashion. These features may also help eliminate a negative user attitude because they do not need to come into direct contact with contaminated components, and the approach is viewed as more sanitary.

In one embodiment of the invention, the component arrangement may differ from the traditional RV in that the valves for dumping the waste tanks are usually located on the left (driver's) side of the coach making it easier for the customer to operate the valves when dumping waste. The invention may have electric waste valves located on the right (passenger) side of the RV. The switches to operate the valves may be located on the left (driver's) side of the RV. This could also be done using manual pull valves, however the user may not be able to view the sewer inlet which could cause the area to be flooded should the sewer back up. The user should keep the sewer inlet in line of sight during the waste evacuation process. Having the switches that operate the valves located on the left (driver's) side of the RV allows the sewer hose in its contracted state to be contained in a tube or isolated area extending to the right (passenger's) side. Attached to the extendible hose end is a valve fitting (hose nozzle) with a handle. The user lifts the hose nozzle using the handle and stretches the hose to the sewer inlet ground connection and places the hose nozzle in contact with the hole. The user then releases the valve latch opening the valve, which may be located internally in the hose nozzle, thus allowing the waste to flow from the RV to the ground receptacle when the waste valve is opened. When the user has completed emptying the waste tanks they close the hose nozzle valve, lift it out of the ground receptacle, and retract the hose and hose nozzle back to its home position. This approach to transferring waste from the RV to the ground receptacle allows a gravity feed system incorporated in most RVs to work while making it an uneventful task for the user.

In one embodiment of the invention a sewer hose nozzle is used to hook up and disconnect a sewer hose from a Recreation Vehicle and may be used for connecting the hose fitting to a ground sewer inlet or port. The sewer hose nozzle helps eliminate the potential for spillage because the nozzle has a technique for stopping residual wastewater from spilling when the nozzle is lifted out of the ground sewer inlet or port. The sewer hose nozzle has a handle to help eliminate the user from having to hold the fittings making the operation much more sanitary. Furthermore, the nozzle is attached to the sewer hose in such a way as to prevent leakage between the hose and nozzle. The handle is used to pull the hose and retract it helping to eliminate the need to handle the hose or other connections making the task of draining the sewage from an RV much less stressful for the user. The hose nozzle may also prevent any residual odor from escaping from the hose causing further embarrassment to the user.

FIG. 1 illustrates one embodiment of the invention. Nozzle 101 has a connection end 102 that may be connected to a hose, for example, a sewer hose that is corrugated and thus collapsible and expandable in length. Other hoses may also be used for this purpose. 104 is a flapper door or valve gate that is operated by a handle 110 that is connected via hinge means 114 to a shaft 108 that is in contact 120 with a part of the valve door 104 to prevent or allow its opening. 106 is an outlet that may be fitted to a tank, portal, etc. Outlet fitting 106 may be stepped as shown to fit various size openings. Outlet fitting 106 may also have a splash guard. As shown in FIG. 1, the flapper door 104 is in a closed and locked (by 108) position.

Figure 2:
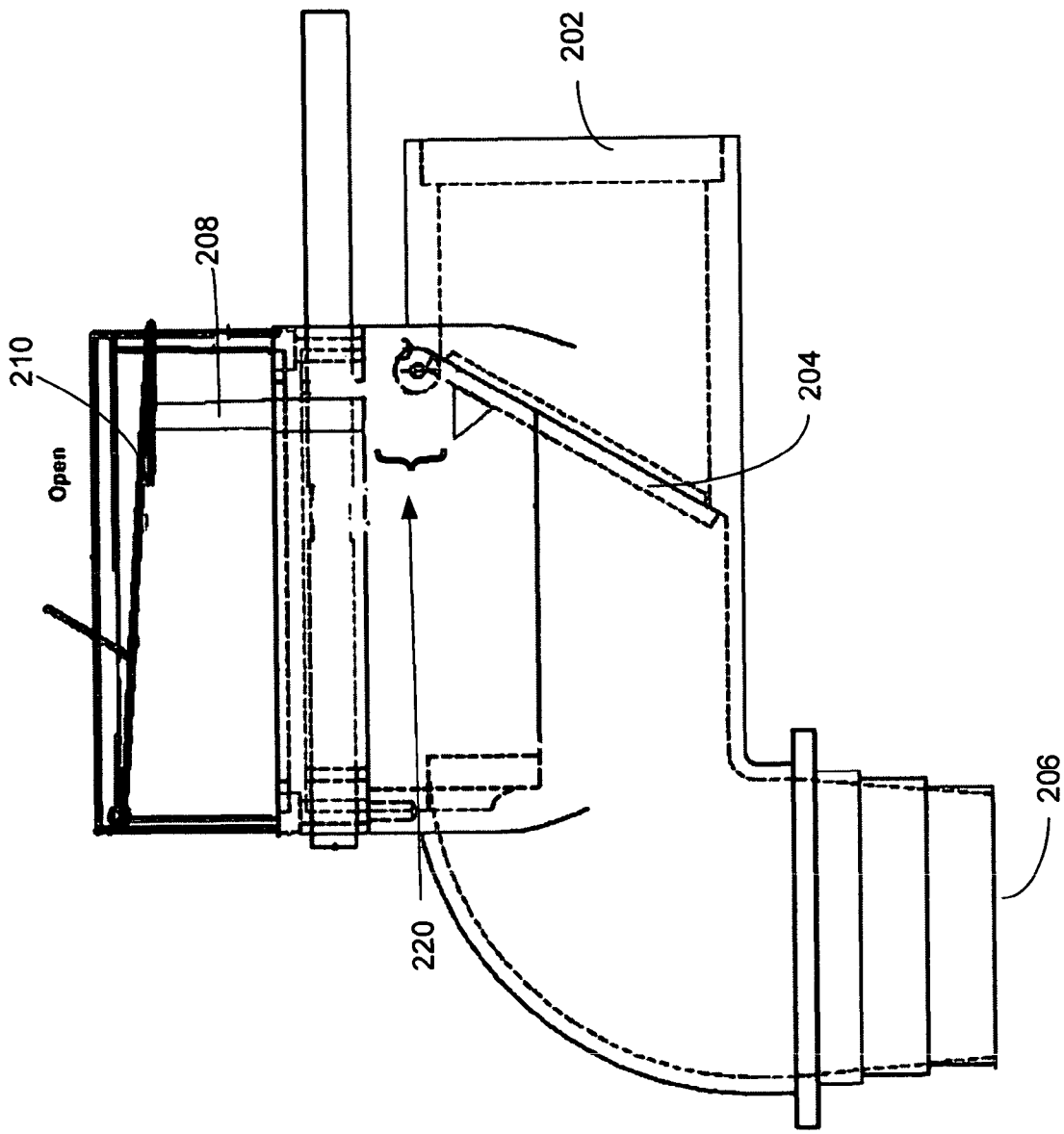

FIG. 2 illustrates one embodiment of the invention. Here the handle 210 is in a raised position and shaft 208 is raised so that gap 220 allows flapper 204 to open and allow a flow from region 202 to 206.

FIG. 3 illustrates what may be considered a standard approach to waste evacuation contrasting it with one embodiment of the invention approach. As will be noted, there are fewer operations.

Figure 4:
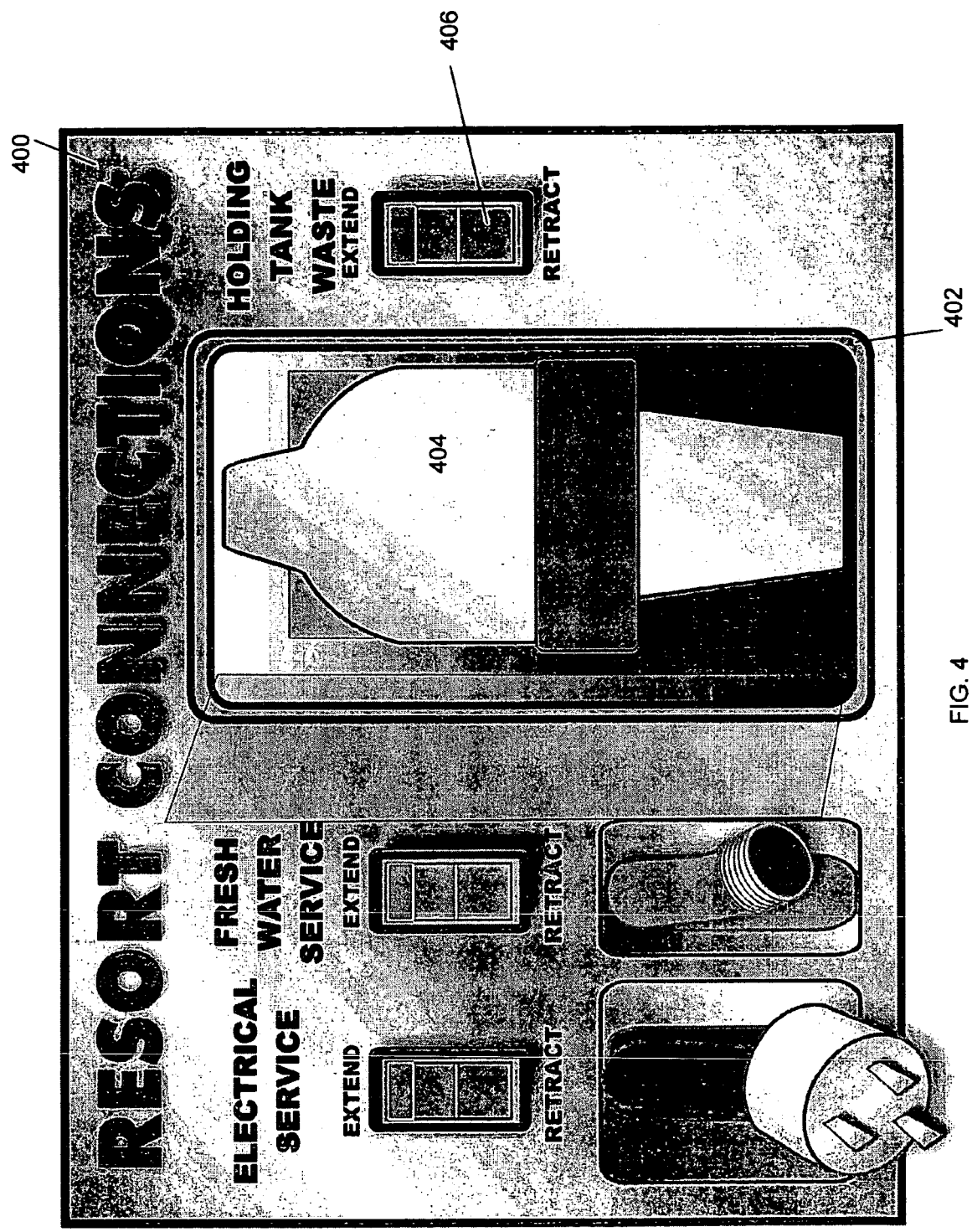
FIG. 4 illustrates one embodiment of the invention showing an access panel.

FIG. 4 illustrates one embodiment of the invention. 400 is an access panel. 402 is a housing and cover for the nozzle 404, and 406 is a mechanism for extending and retracting a hose, for example, a sewer hose.

Figure 5:
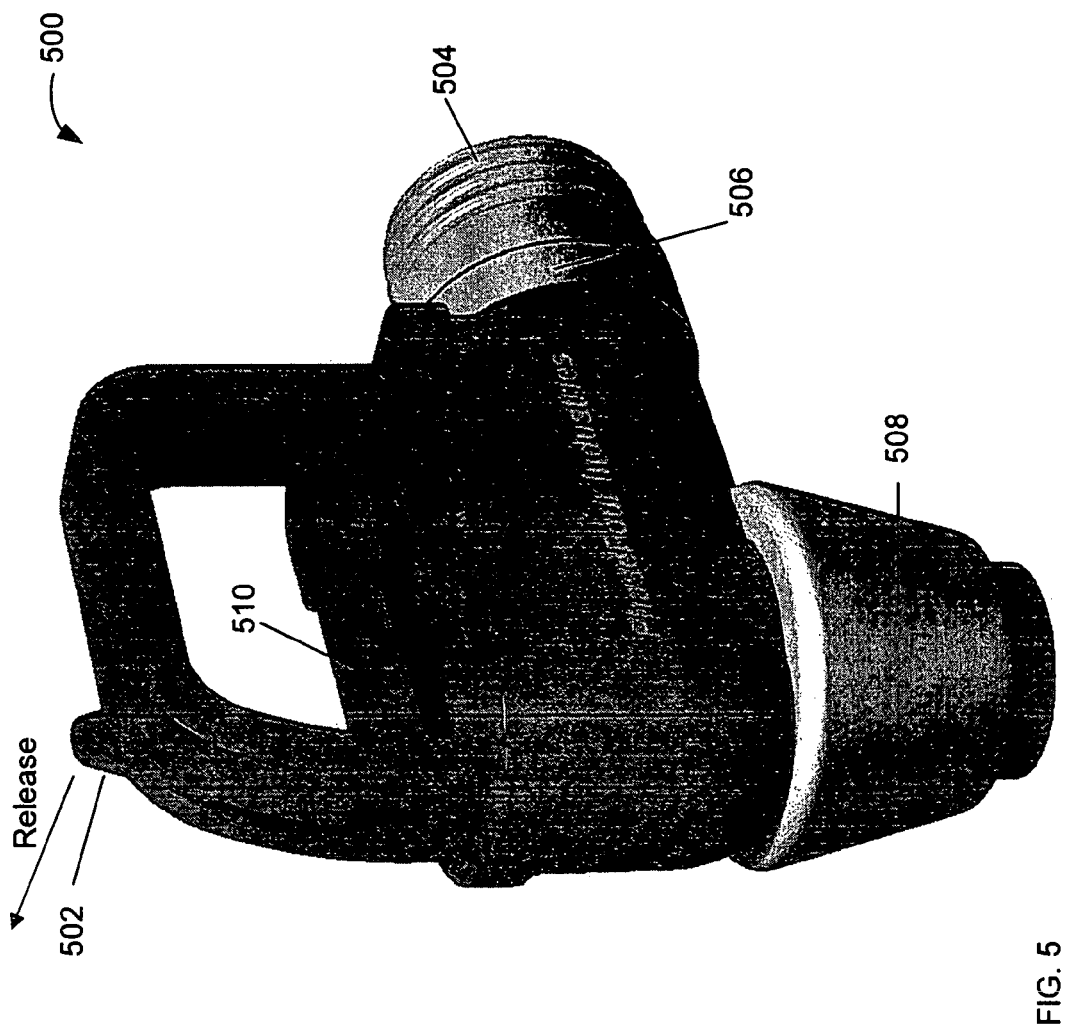
FIG. 5, and FIG. 6 illustrate embodiments of a hose nozzle.

FIG. 5 illustrates one embodiment of a hose nozzle 500. There is a release mechanism 502 for a handle 510. Nozzle 508 may have various shapes, such as a taper, to fit a tank or portal. Connection 504 connects to a hose, for example, a sewer hose. 504 and 506 are constructed such that they may rotate, pivot, swivel, etc.

Figure 6:
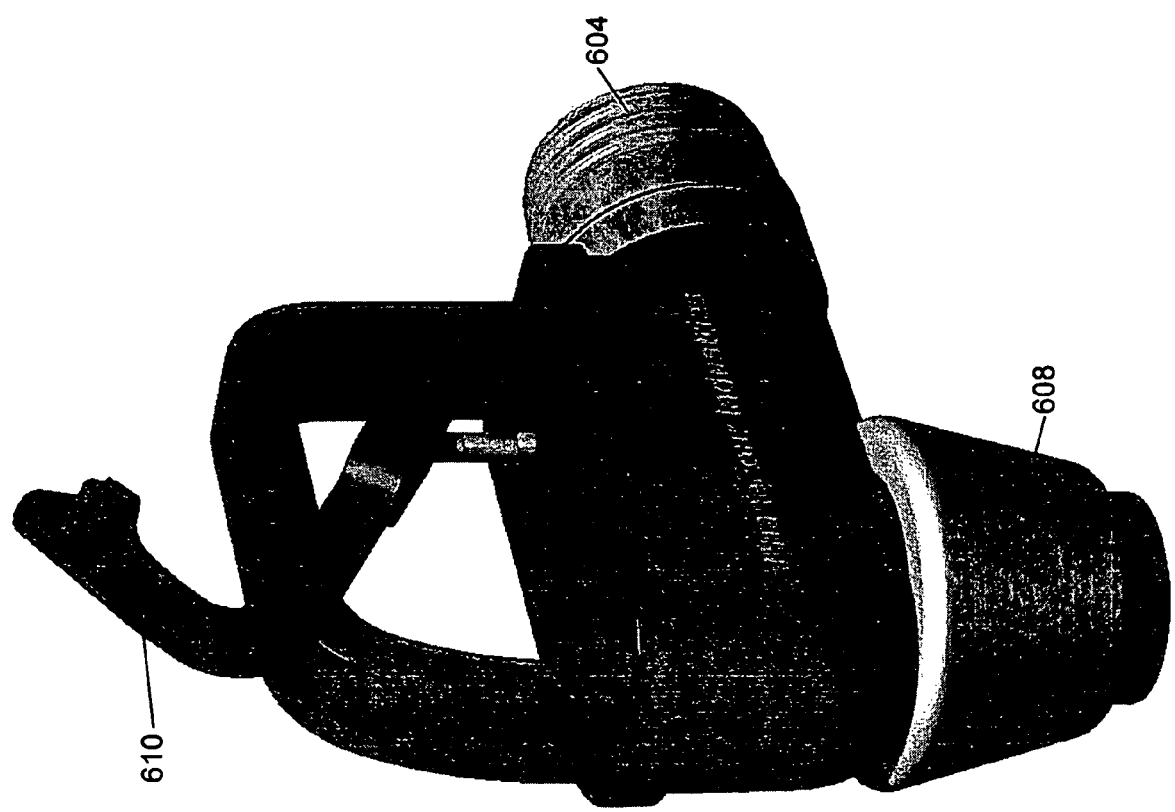

FIG. 6 illustrates one embodiment of a hose nozzle showing the handle 610 in an open position for allowing flow from a hose attached at 604 to a destination in contact with the nozzle adapter 608.

Figure 28:
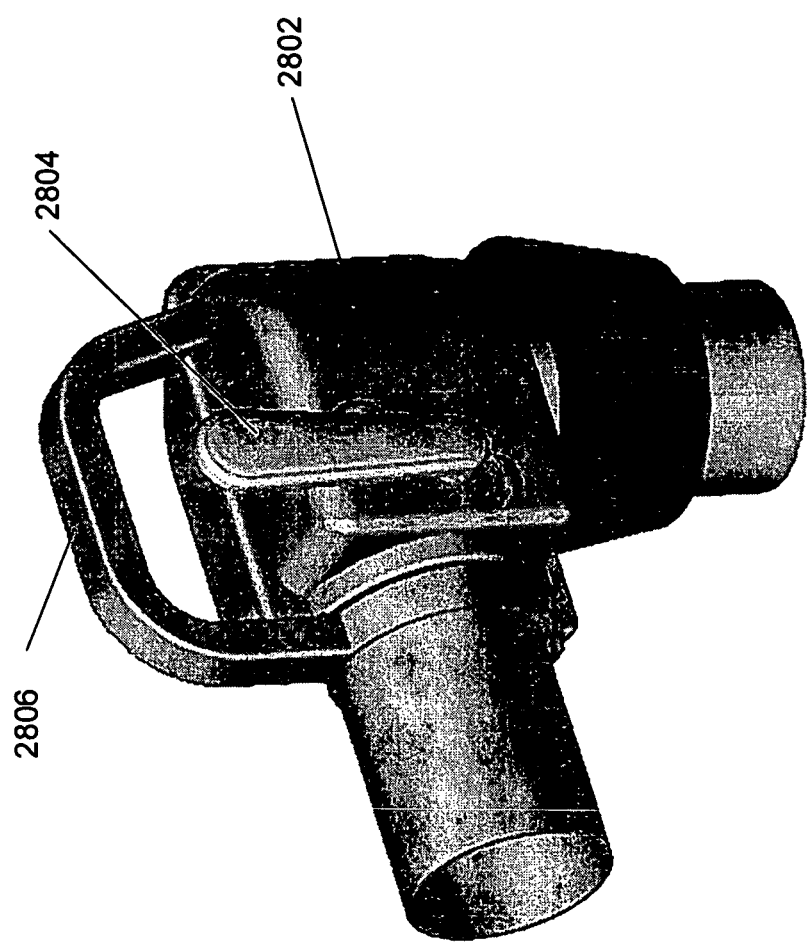
FIG. 28 shows an embodiment of the invention with a valve handle on the side.

One of skill in the art will understand that there are many possible variations of a handle, such as that shown in FIG. 6 at 610. For example, a handle performing the same function as 610 (opening and closing a valve among other things) in FIG. 6 may be located on the side of the hose nozzle body. For example, FIG. 28 shows a handle on the side of the hose nozzle body.

Figure 7:
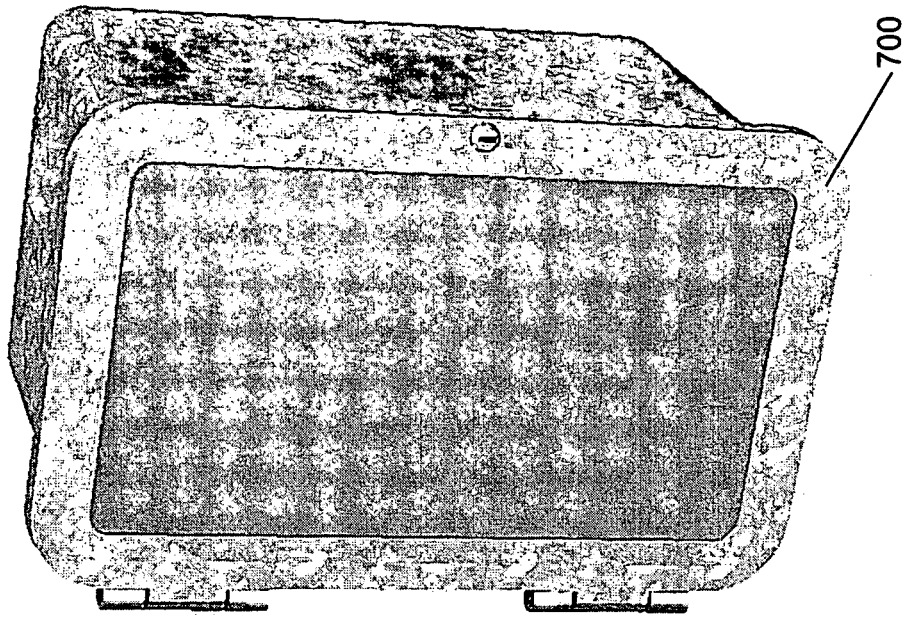
FIG. 7, FIG. 8, and FIG. 9 show various embodiments of an enclosure, and hose nozzle.

FIG. 7 illustrates one embodiment of an enclosure 700 for a hose nozzle.

Figure 8:
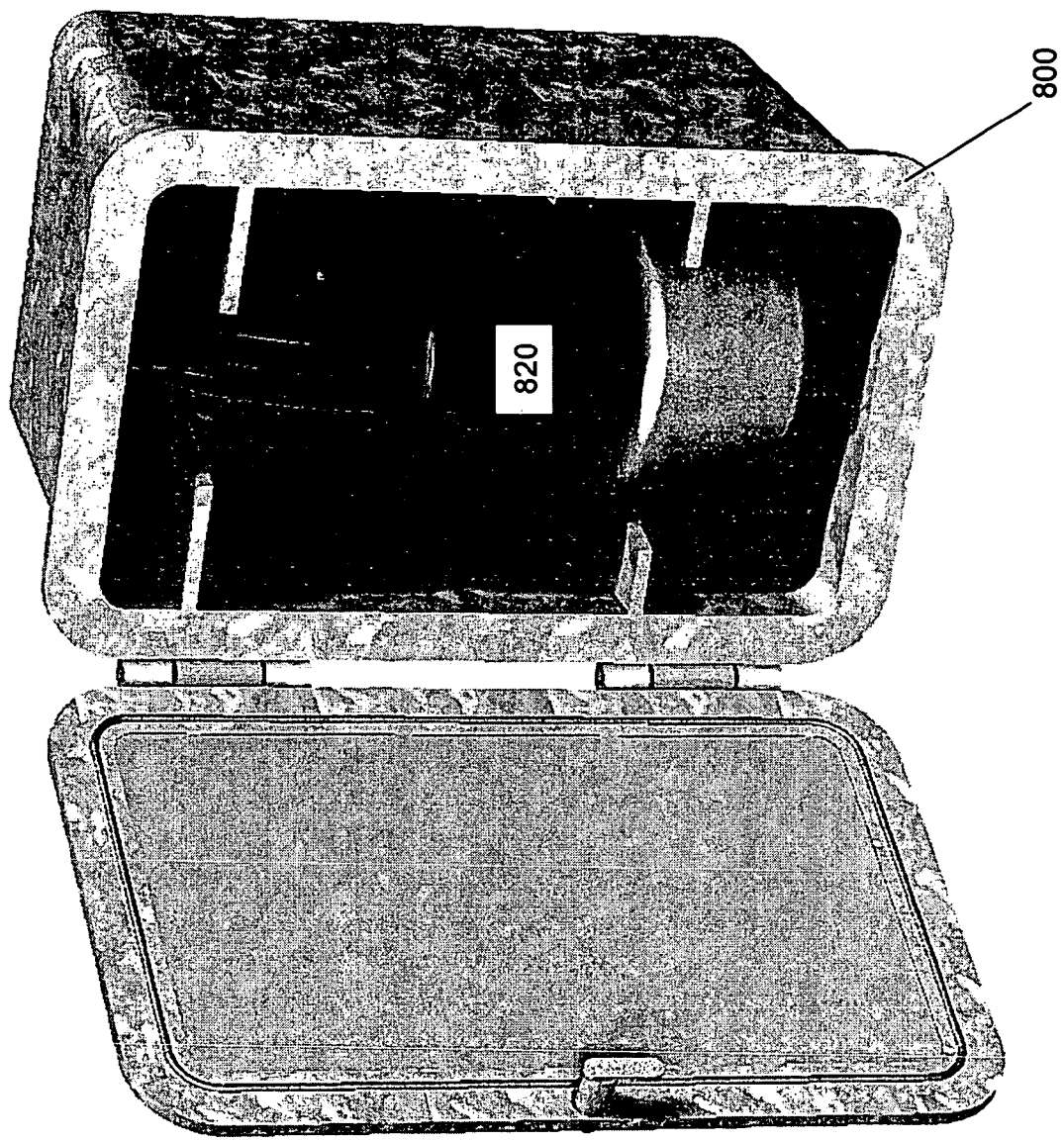

FIG. 8 illustrates one embodiment of an enclosure 800 for a hose nozzle 820 showing how the hose nozzle 820 may be situated within the enclosure 800.

Figure 9:
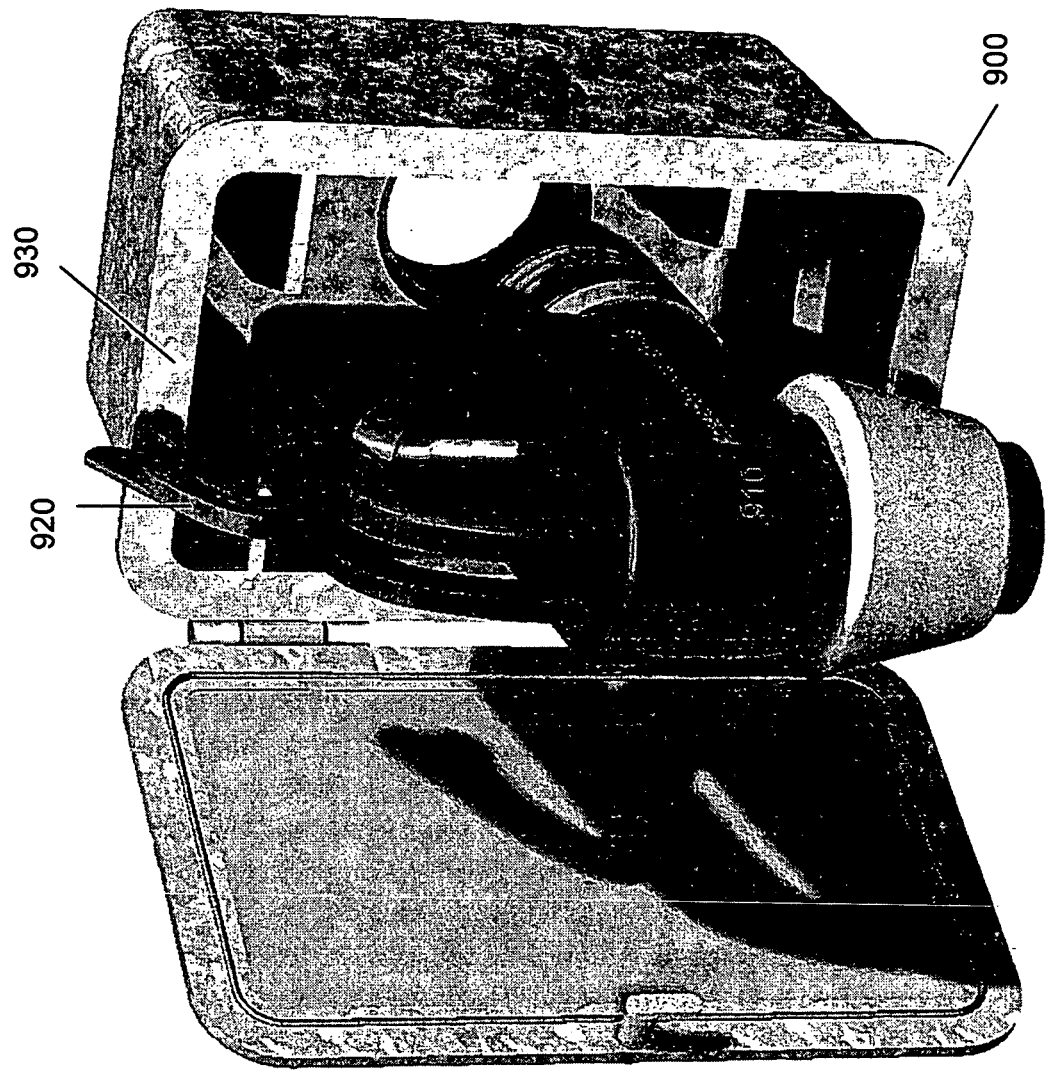

FIG. 9 illustrates one embodiment of a mechanical interlock between an enclosure 900 and a nozzle 910. The top edge 930 of the enclosure 900 will not allow the nozzle 910 to be fully inserted if the handle 920 is in the open position. In this way, the nozzle valve may be assured to be closed if the nozzle is fully within the enclosure 900.

One of skill in the art will understand that there are many possible variations of a handle, and a mechanical interlock system possible. For example, a handle performing the same function as 920 in FIG. 9 may be located on the side of the body 910. For example, FIG. 28 shows a handle on the side of the hose nozzle body.

Figure 10:
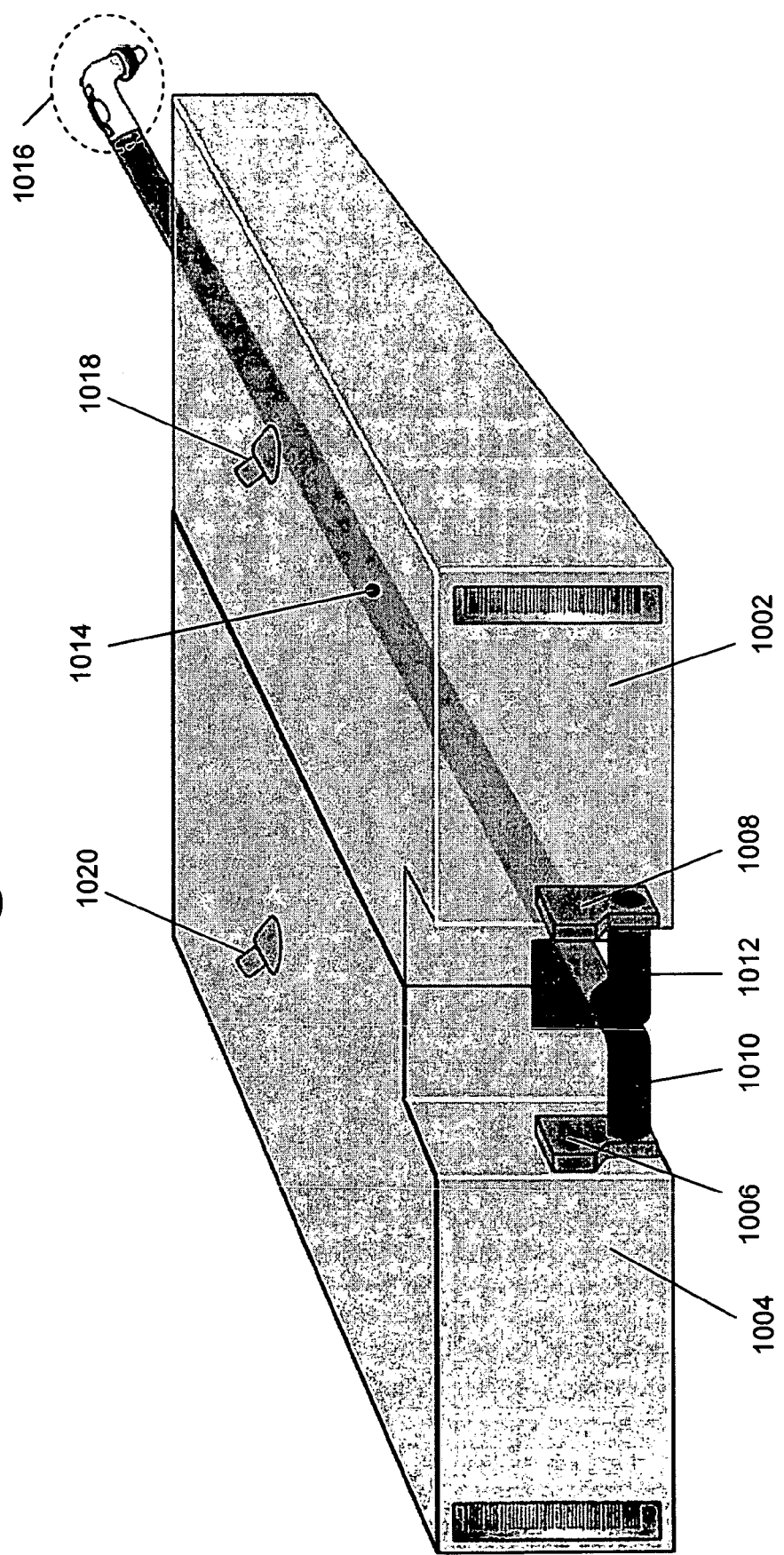
FIG. 10, FIG. 11, and FIG. 12 illustrate various embodiments of the invention showing different arrangements.

FIG. 10 illustrates one embodiment of the invention. Two tanks or containers 1002 and 1004 are shown. Here, on the passenger side of a RV are located valves 1006 and 1008 feeding into a plumbing system 1010 and 1012 respectively that join to a single hose 1014 which traverses across the tanks and emerges on another side, for example, the driver's side where it terminates in a nozzle 1016. By placing the valves on one side of a vehicle and the nozzle on another, a hose, such as 1014 may be a collapsible or extendible hose and thus in a closed or compacted form fit within the width of a vehicle and when extended may go to a portal some distance away from the vehicle.

Note that in an RV the tanks such as those illustrated at 1002 and 1004 are often used to hold what is referred to as black and gray (or grey) water. Thus the tank holding the black water is often referred to as a black tank and the tank holding the gray water is often referred to as a gray tank. Black water is considered sewage from such sources as a toilet, etc. Gray water is considered sewage from such sources as sinks, showers, etc. 1018 and 1020 represent input/output ports for the tanks 1002 and 1004 respectively. These allow water to flow in and gases to flow out. For example, if 1004 is used to hold black water, 1020 may be connected to a toilet assembly consisting of a toilet, a U-trap, and a sewer gas venting pipe which allows any gases generated from decomposing waste in tank 1004 to vent out the top of the vehicle.

While FIG. 10 illustrates the tanks connecting to a common single hose 1014, the present invention is not so limited. That is, each tank (such as 1002 and 1004) may have its own hose for waste evacuation.

Figure 11:
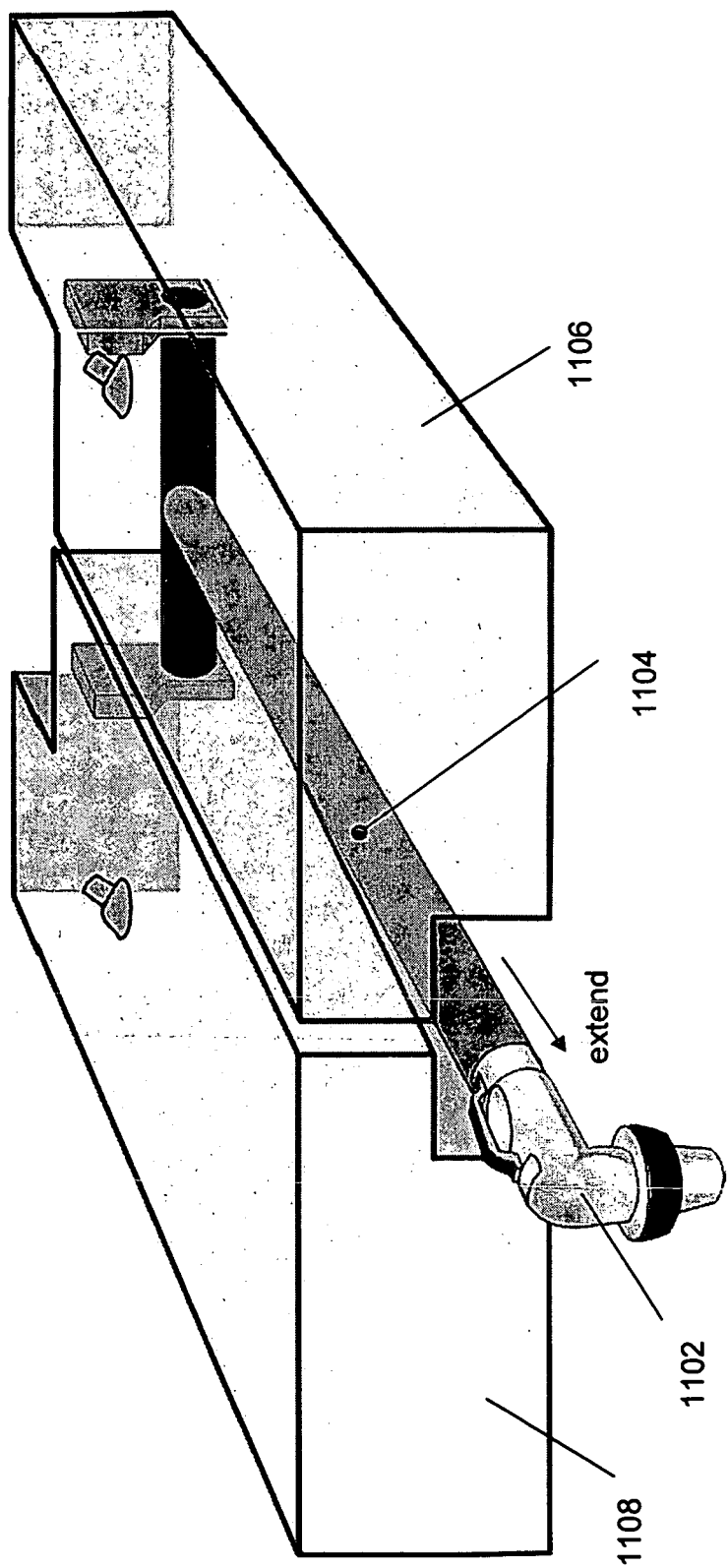

FIG. 11 illustrates one embodiment of the invention. Two tanks or containers 1106 and 1108 are shown. Here, on the driver side of a RV is the nozzle 1102 shown being extended from, for example, a collapsible hose 1104. While the hose 1104 is shown extending from a linear "reel", other embodiments are also possible, such as a semi-circular shape. Note that any shape that allows the hose to be attached at the passenger side and extend from the driver side would work. It would be possible, for example, to place the waste valves on the driver's side of the RV if a mechanism was used to allow the hose to extend from the side of the RV first and the connection on the other end of the hose having slid to the driver's side allowed interfacing with the outlet of the valves.

Figure 12:
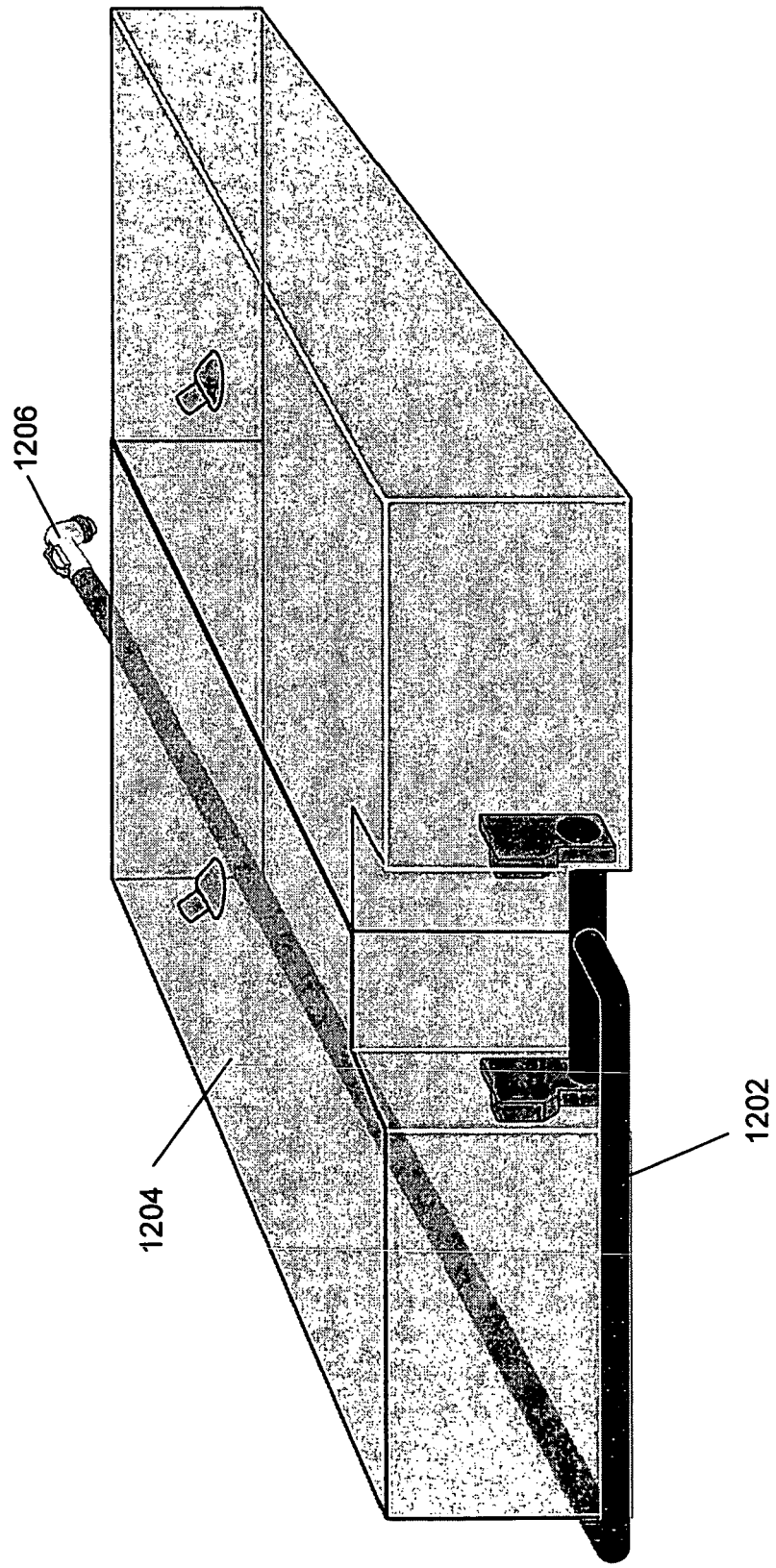

FIG. 12 illustrates one embodiment of the invention where from the passenger side the hose 1202 takes a route around a tank 1204 to the nozzle 1206. The hose may take other routes as well, for example, over/under tanks, etc.

Figure 13:
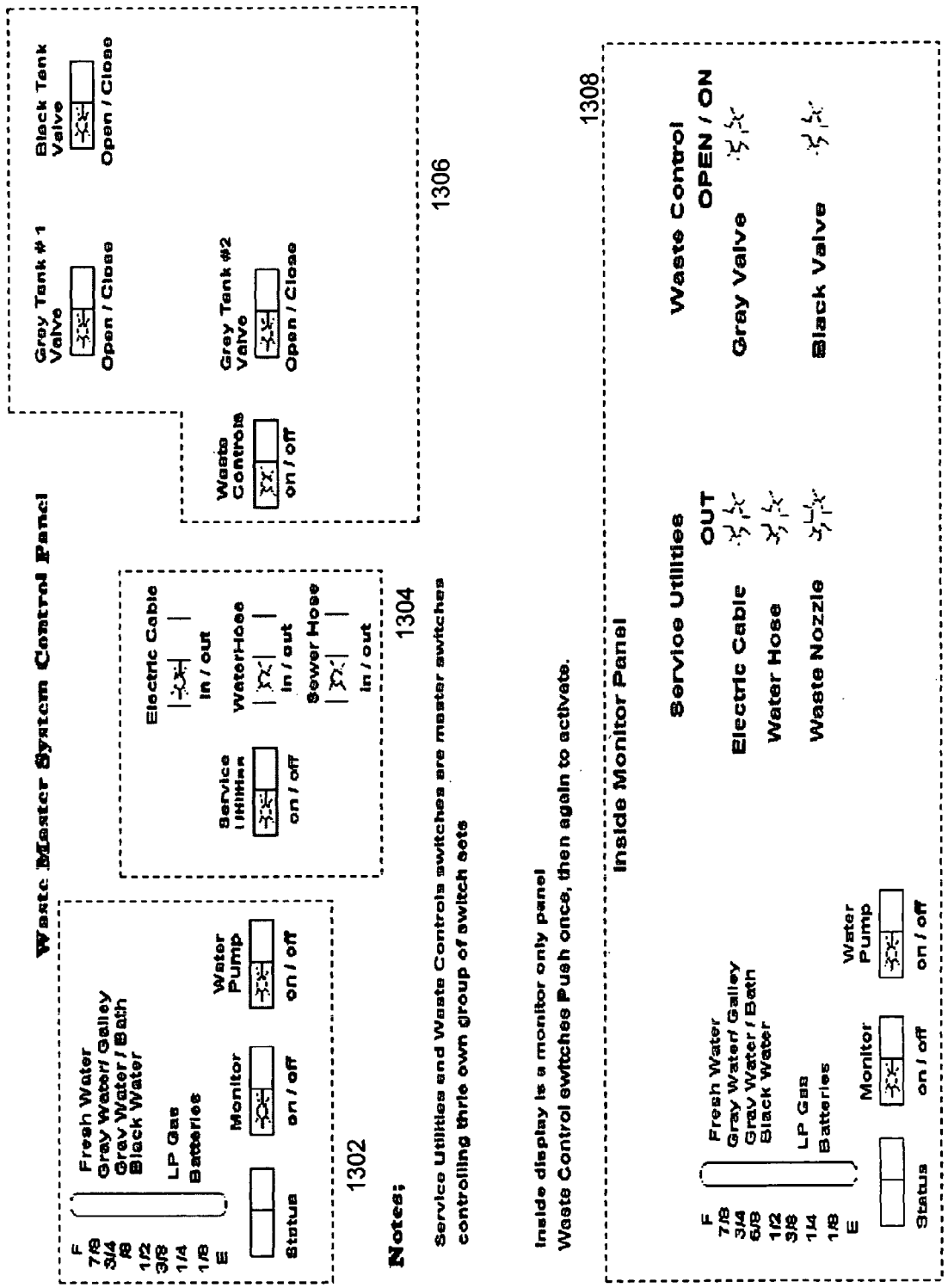
FIG. 13 illustrates one embodiment of the invention showing a system control panel and an inside monitor panel.

FIG. 13 illustrates one embodiment of the invention showing a system control panel and an inside monitor panel. Monitor status 1302 shows the state of various entities, a monitor indicator light (shown on), and water pump. 1304 illustrates service utilities and their status, and 1306 indicates status of tanks and additives. An inside monitor control panel 1308 has status of various entities. The control panel (1302, 1304, and 1306) may be located in a variety of places; one such place may be the side of a RV. The inside monitor panel 1308 may be placed inside the coach of a RV.

In one embodiment of the invention, the collapsible hose may be attached to a mechanism for extending and retracting the hose. One such way to expand and contract the hose is to apply increased or decreased pressure to the inside of the hose. For example, a higher pressure inside the collapsible (extendible) hose as compared to the outside atmospheric pressure will cause the hose to expand or increase in length. Likewise a lower pressure in the collapsible (extendible) hose than the outside atmospheric pressure, will, if the hose is constructed properly, allow it to contract in length (i.e. retract) rather than having the walls of the hose collapse. Thus a source of increased air pressure or reduced air pressure in communication with the hose may cause the hose to expand or contract.

Figure 14:
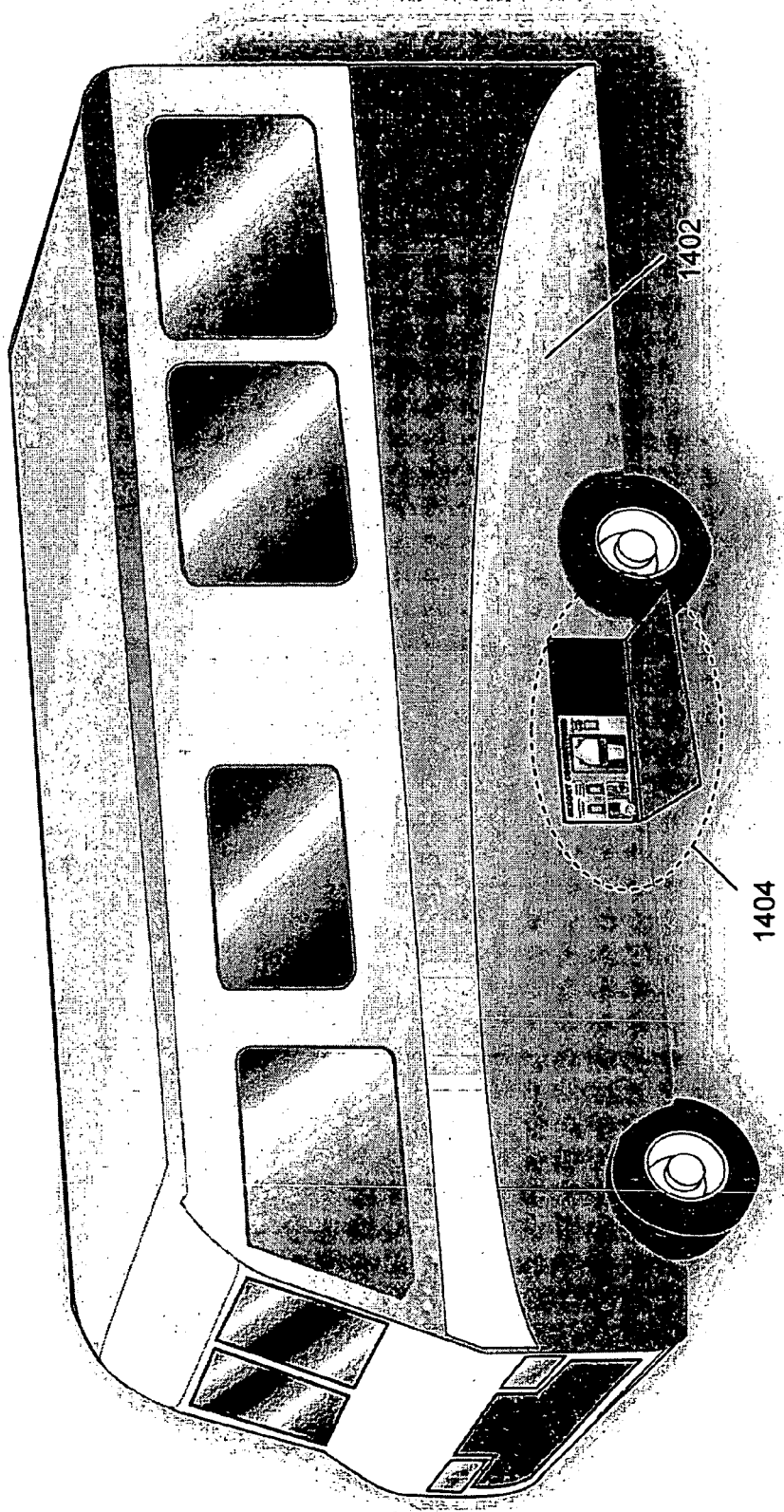
FIG. 14 illustrates one embodiment of the invention showing a RV and the access panel.

FIG. 14 illustrates one embodiment of the invention, showing a RV 1402 from the driver side, illustrating an access panel 1404 that may house controls, the nozzle, etc. The access panel may be located on the side as illustrated but other embodiments are also possible. For example, the access panel or door may swing downward from the undercarriage of a vehicle.

Figure 15:
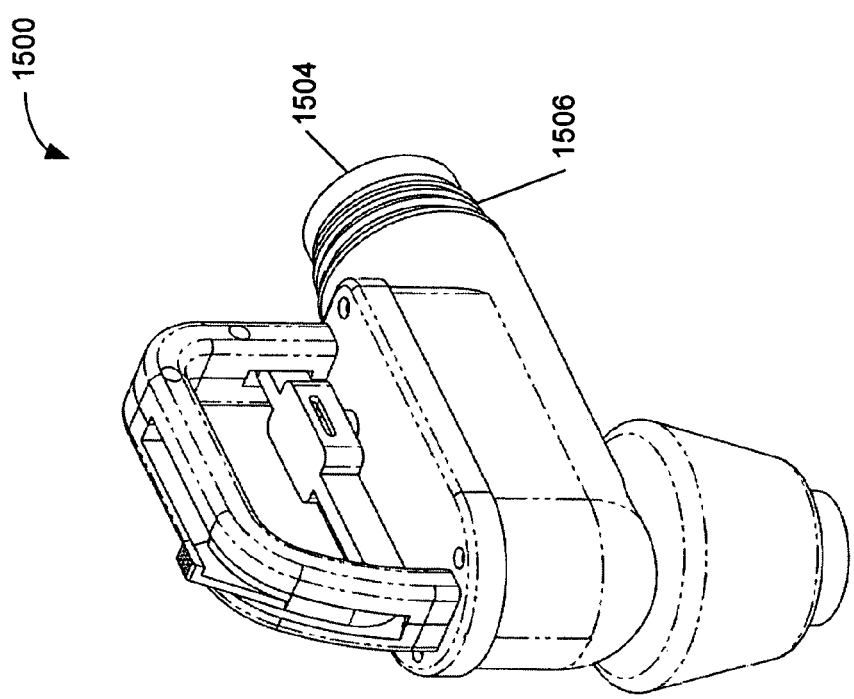
FIG. 15, FIG. 16, FIG. 17, FIG. 18, FIG. 19, FIG. 20, FIG. 21, FIG. 22, and FIG. 23 show various embodiments of the invention hose nozzle.

FIG. 15 illustrates one embodiment of a hose nozzle 1500. The nozzle 1500 connects to a hose, for example, a sewer hose at 1504 through a rigid connection (1506). In this embodiment, the nozzle 1500 is attached to a hose so that any tilting, rotation, and pivoting is that which is allowed by the flexibility of the hose.

Figure 16:
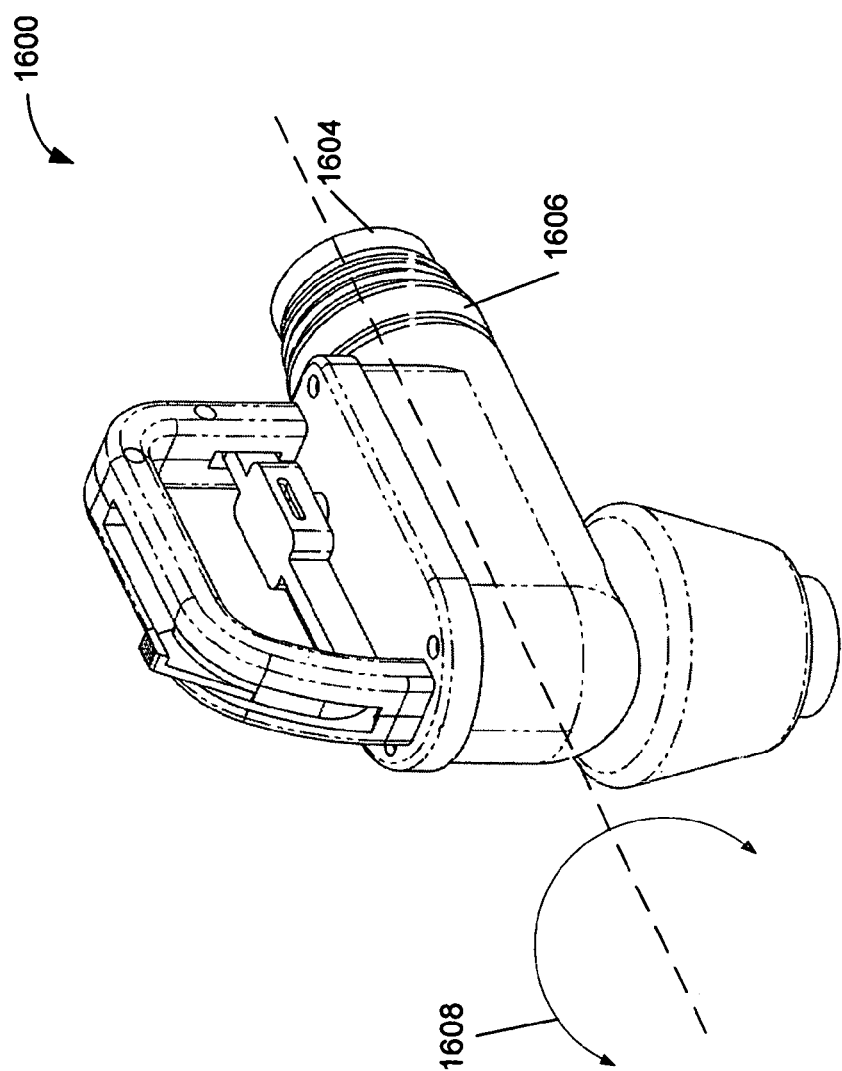

FIG. 16 illustrates one embodiment of a hose nozzle 1600. The nozzle 1600 connects to a hose, for example, a sewer hose at 1604 through a swivel connection 1606. In this embodiment, the nozzle 1600 may rotate as indicated 1608 with respect to a hose connected at 1604.

Figure 17:
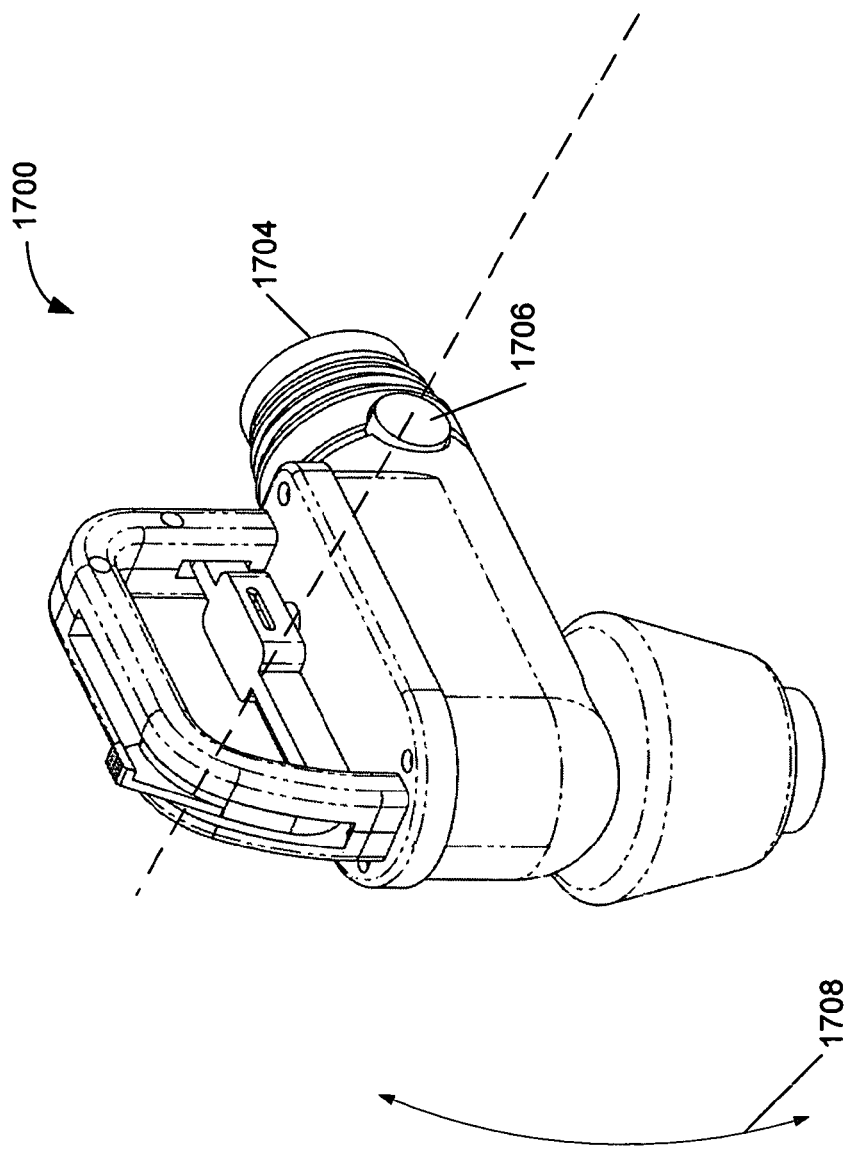

FIG. 17 illustrates one embodiment of a hose nozzle 1700. The nozzle 1700 connects to a hose, for example, a sewer hose at 1704 through a pivoting connection 1706. In this embodiment, the nozzle 1700 may pivot or tilt as indicated 1708 with respect to a hose connected at 1704.

Figure 18:
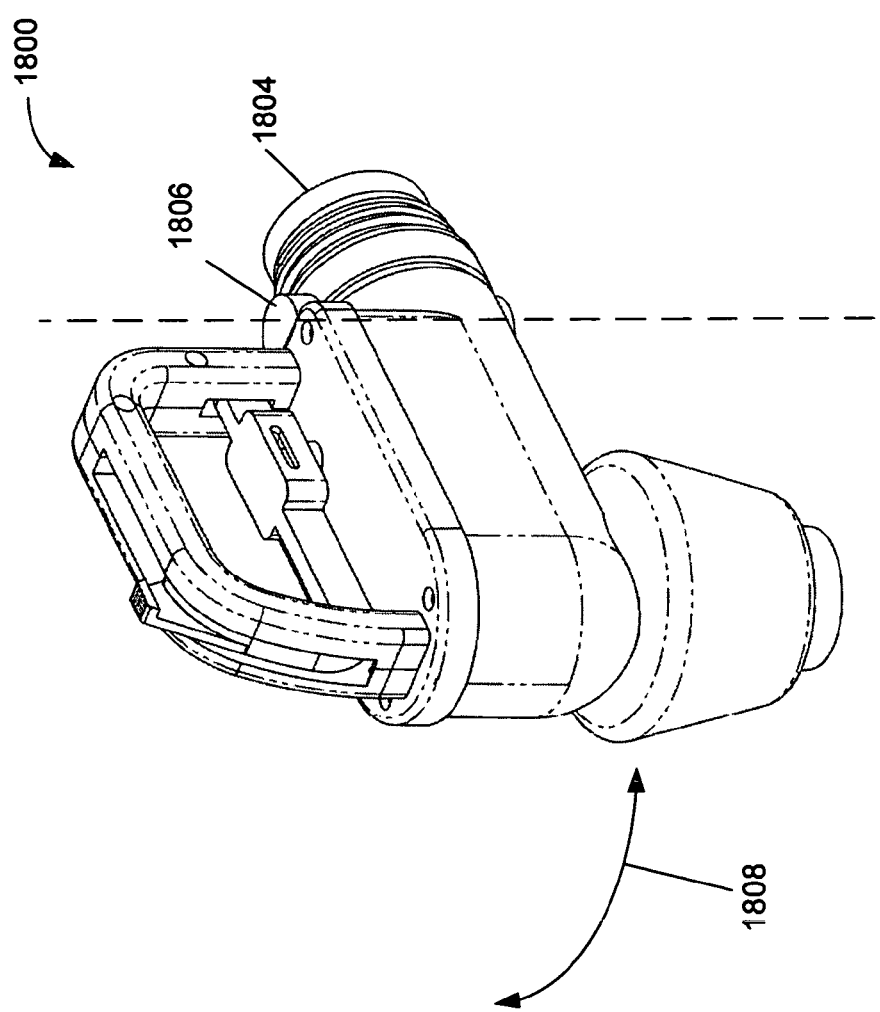

FIG. 18 illustrates one embodiment of a hose nozzle 1800. The nozzle 1800 connects to a hose, for example, a sewer hose at 1804 through a pivoting connection 1806. In this embodiment, the nozzle 1800 may pivot or swing side to side as indicated 1808 with respect to a hose connected at 1804.

Figure 19:
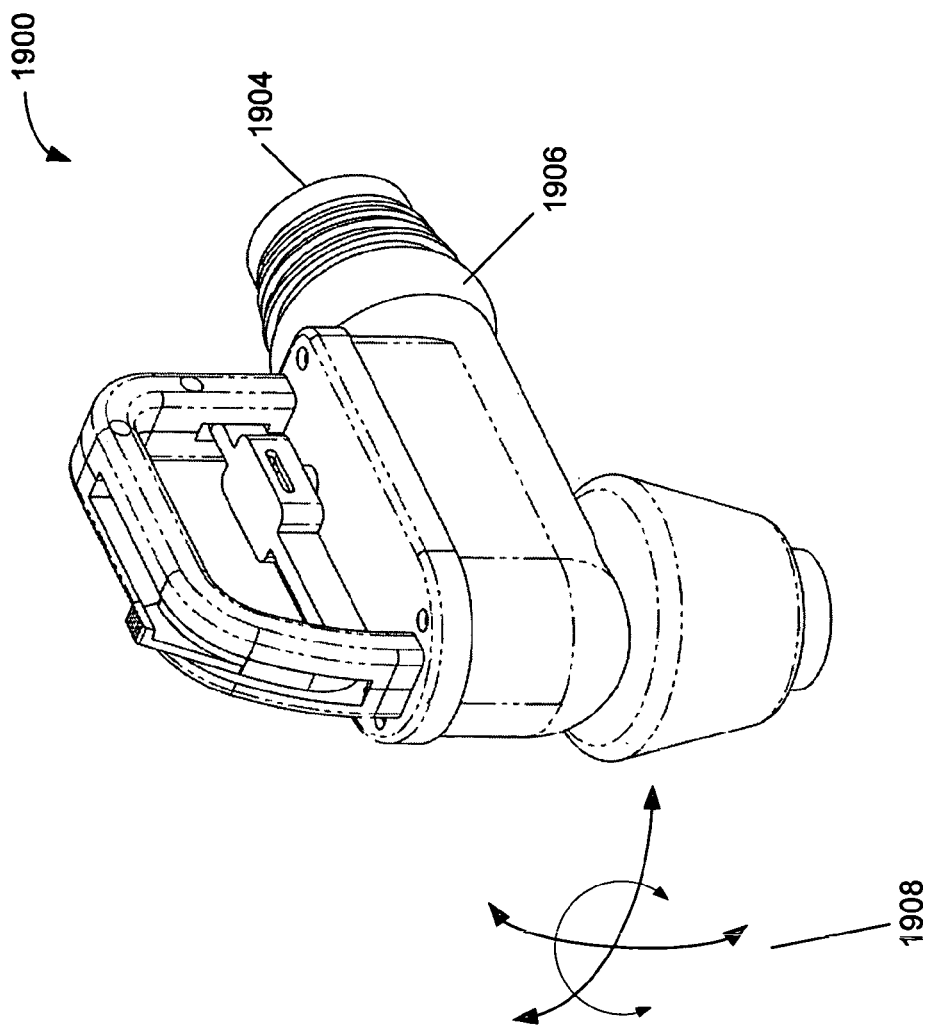

FIG. 19 illustrates one embodiment of a hose nozzle 1900. The nozzle 1900 connects to a hose, for example, a sewer hose at 1904 through a ball joint type connection 1906. In this embodiment, the nozzle 1900 may pivot, swing, tilt, and/or rotate as indicated 1908 with respect to a hose connected at 1904.

Figure 20:
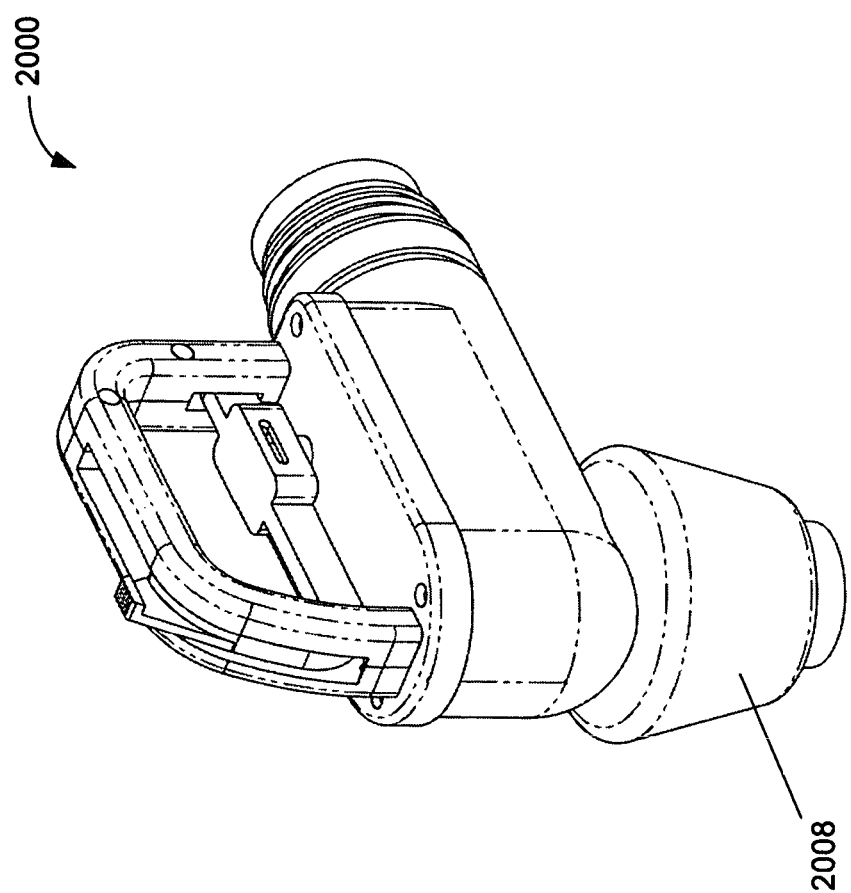

FIG. 20 illustrates one embodiment of a hose nozzle 2000. Nozzle fitting 2008 has a taper type shape to fit a tank or portal opening.

Figure 21:
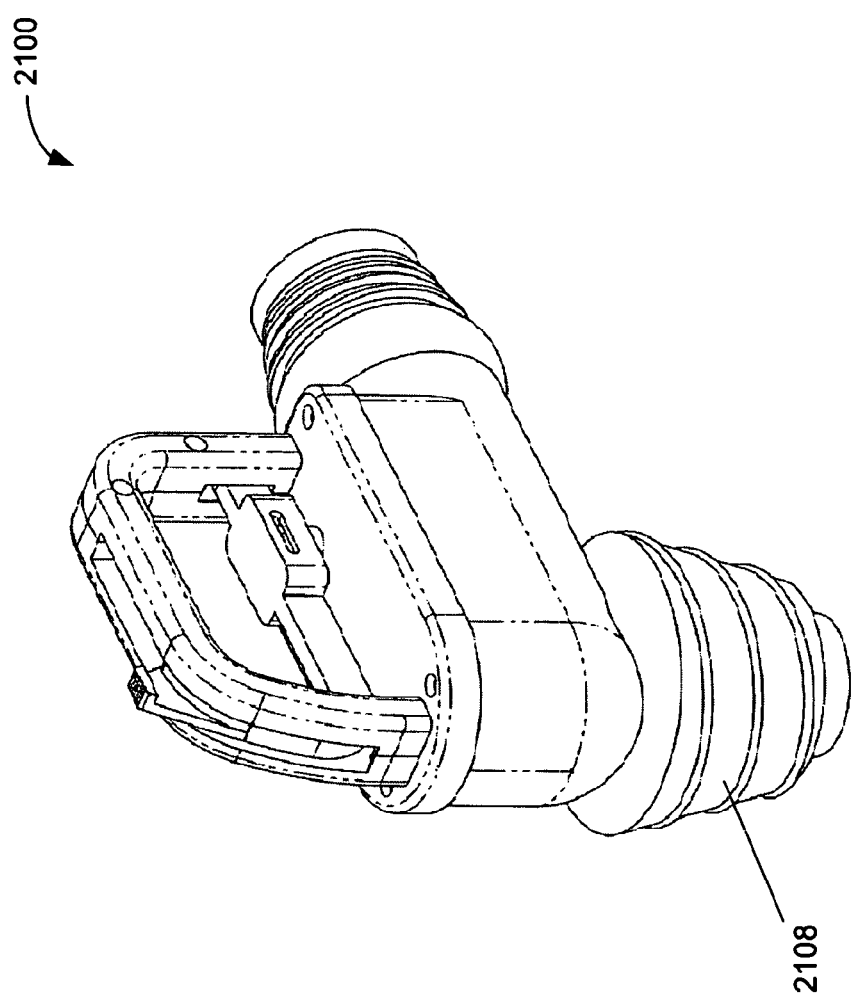

FIG. 21 illustrates one embodiment of a hose nozzle 2100. Nozzle fitting 2108 is a screw type for connection to a tank, portal, or receptacle. Note that as shown 2108 is a tapered screw, however, other embodiments may have a straight screw connection. Also it is to be understood that the screw pitch may be at a higher angle, that there may be multiple threads, and that the screw may be either an external thread like a bolt (male), or an internal thread like a nut (female). Additionally, the treading mechanism may be firmly attached to the hose nozzle 2100 or may be freely rotatable via a captive type mechanism so that a user may easily rotate the nozzle fitting 2108 to make a connection.

Figure 22:
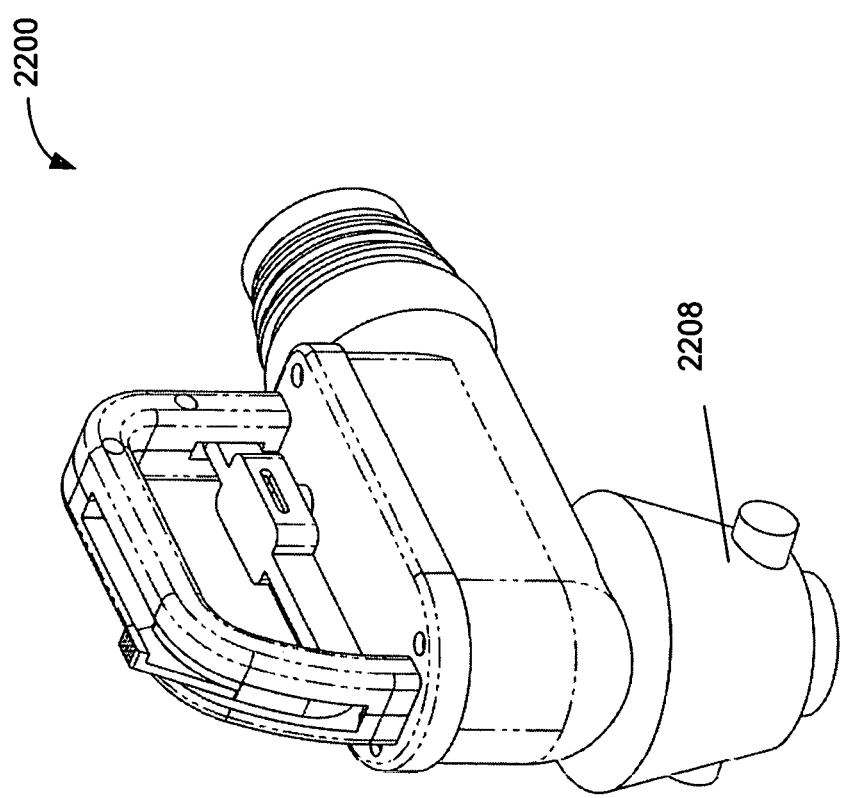

FIG. 22 illustrates one embodiment of a hose nozzle 2200. Nozzle fitting 2208 is a bayonet type connection for connecting to a tank, portal, or receptacle. Note that as shown 2208 is a tapered bayonet, however, other embodiments may have a straight bayonet connection. Also it is to be understood that the bayonet may consist of more than two "pins." For example, in one embodiment, a bayonet may consist of an arrangement of 4 pins. While FIG. 22 shows a male bayonet connection, It is to be understood that the bayonet connection on the nozzle 2200 may consist of the female part of the bayonet connection.

Figure 23:
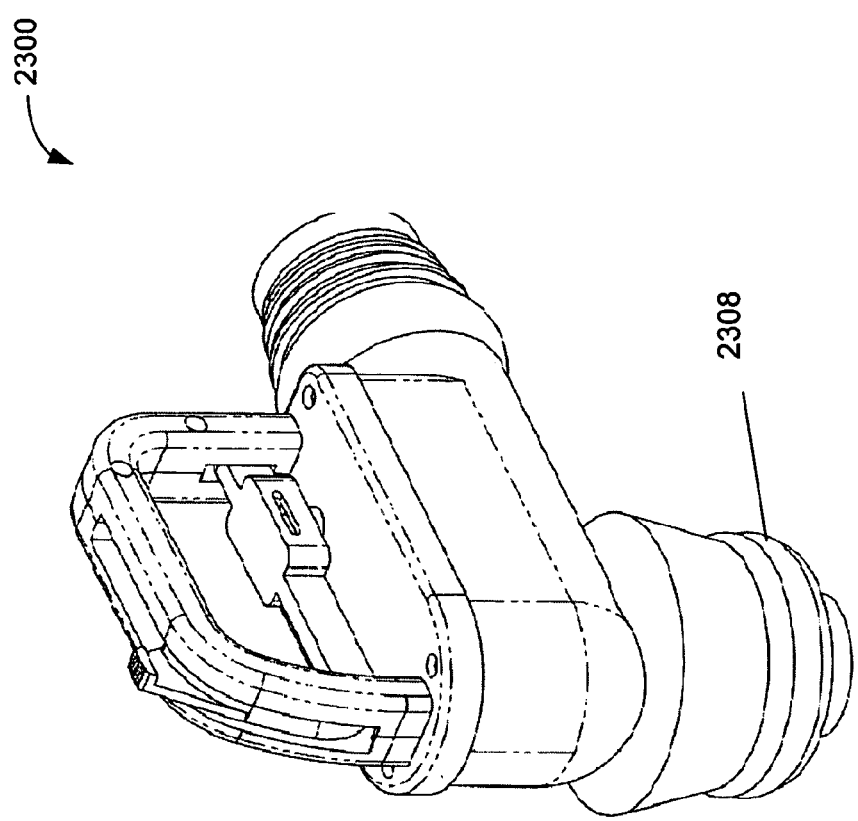

FIG. 23 illustrates one embodiment of a hose nozzle 2300. Nozzle fitting 2308 has an expandable ring or collar 2308 that may seal forming a connection to a tank, portal, or receptacle. This expanding collar may be, but is not limited to, an air bladder, a mechanical bladder, an expanding ring, etc. For example, the collar 2308 when in a compressed or released state has a diameter smaller than when it is inflated or expanded. In the released state it may be inserted into, for example, a circular pipe. The collar 2308 may then be expanded to form a substantially solid seal with the circular pipe. Such a connection may prevent fluids from splashing back, for example, onto the handle of the nozzle. The bladder or expandable collar or ring may be activated by a mechanical means, air means, electrical means, etc. For example a mechanical means may operate much like bottle stoppers that use a lever to compress a rubber-like ring against the sides of a wine bottle. Alternatively, the sealing mechanism (the ring or collar) may operate using isotropic elasticity, i.e. making use of Poisson's ratio.

Figure 24:
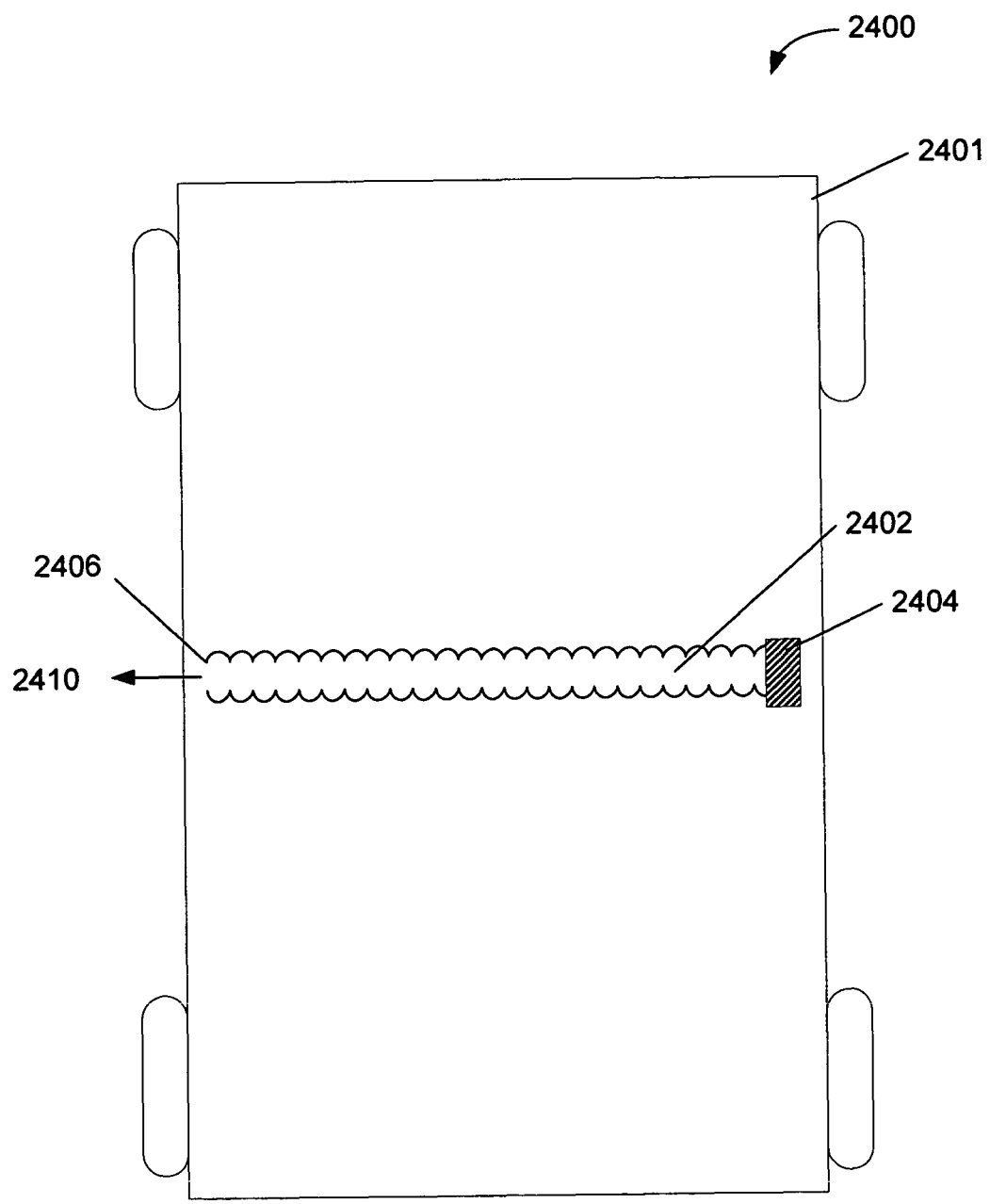
FIG. 24, FIG. 25, FIG. 26, and FIG. 27 show various embodiments of hose arrangements of the invention.

FIG. 24 illustrates one embodiment 2400 of the invention. 2401 is a top view of a vehicle. 2402 is an expandable hose shown in a retracted state. One end of the hose is permanently connected at 2404 to, for example, waste tanks located on the vehicle 2401. The other end of the expandable hose 2406 may be extended in the direction 2410. Not shown in FIG. 24 is a guiding channel, or housing surrounding the hose, that may be present.

Figure 25:
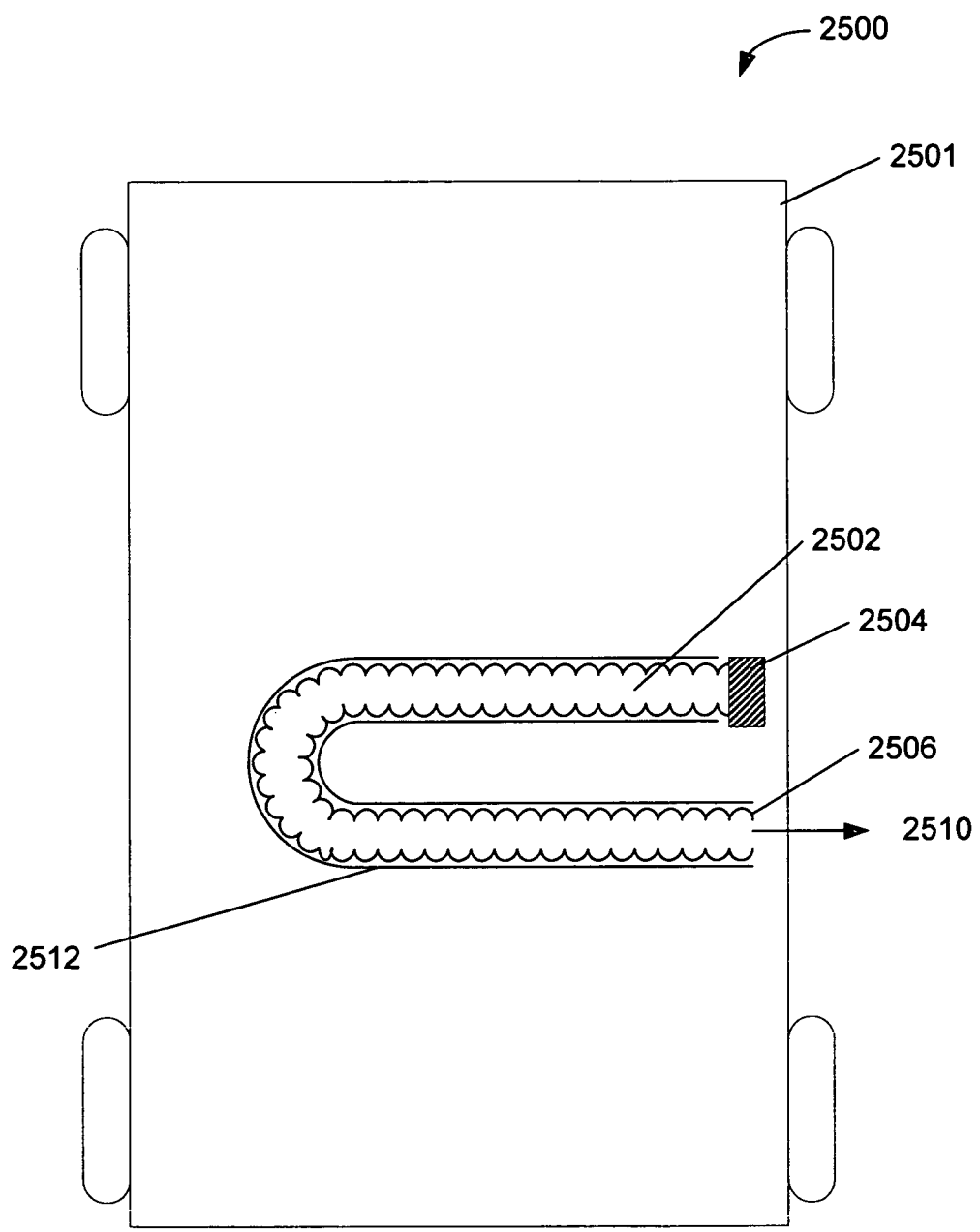

FIG. 25 illustrates one embodiment 2500 of the invention. 2501 is a top view of a vehicle. 2502 is an expandable hose shown in a retracted state. One end of the hose is fixedly connected at 2504 to, for example, waste tanks located on the vehicle 2501. The other end of the expandable hose 2506 may be extended in the direction 2510. 2512 is a housing in which the hose 2502 may freely expand and contract. In the embodiment shown in FIG. 25 it will be noted that the fixed end of the hose and the end which can be extended are both located on the same side of the vehicle.

Figure 26:
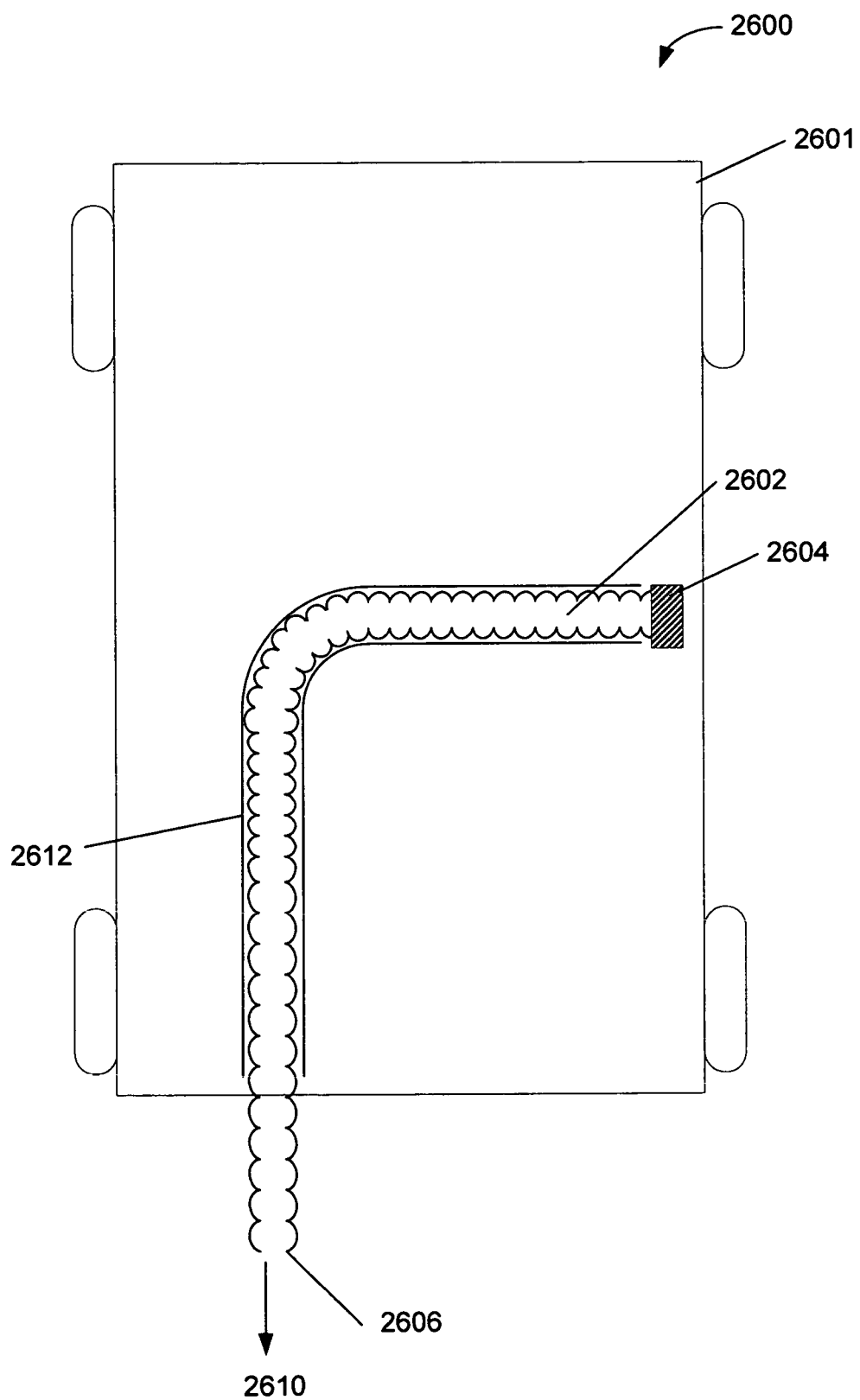

FIG. 26 illustrates one embodiment 2600 of the invention. 2601 is a top view of a vehicle. 2602 is an expandable hose shown in a partially extended state. One end of the hose is always connected at 2604 to, for example, waste tanks located on the vehicle 2601. The other end of the expandable hose 2606 is shown extended in the direction 2610. 2612 is a housing in which the hose 2602 may freely expand and contract. In the embodiment shown in FIG. 26 it will be noted that the end of the hose which can be extended is at an angle 90 degrees from the fixed end (2604), and as illustrated exits from the back (or front) of the vehicle. Other variations, such as a diagonal routing of the hose (right rear to left front), etc., will be understood as possible by one of skill in the art.

Figure 27:
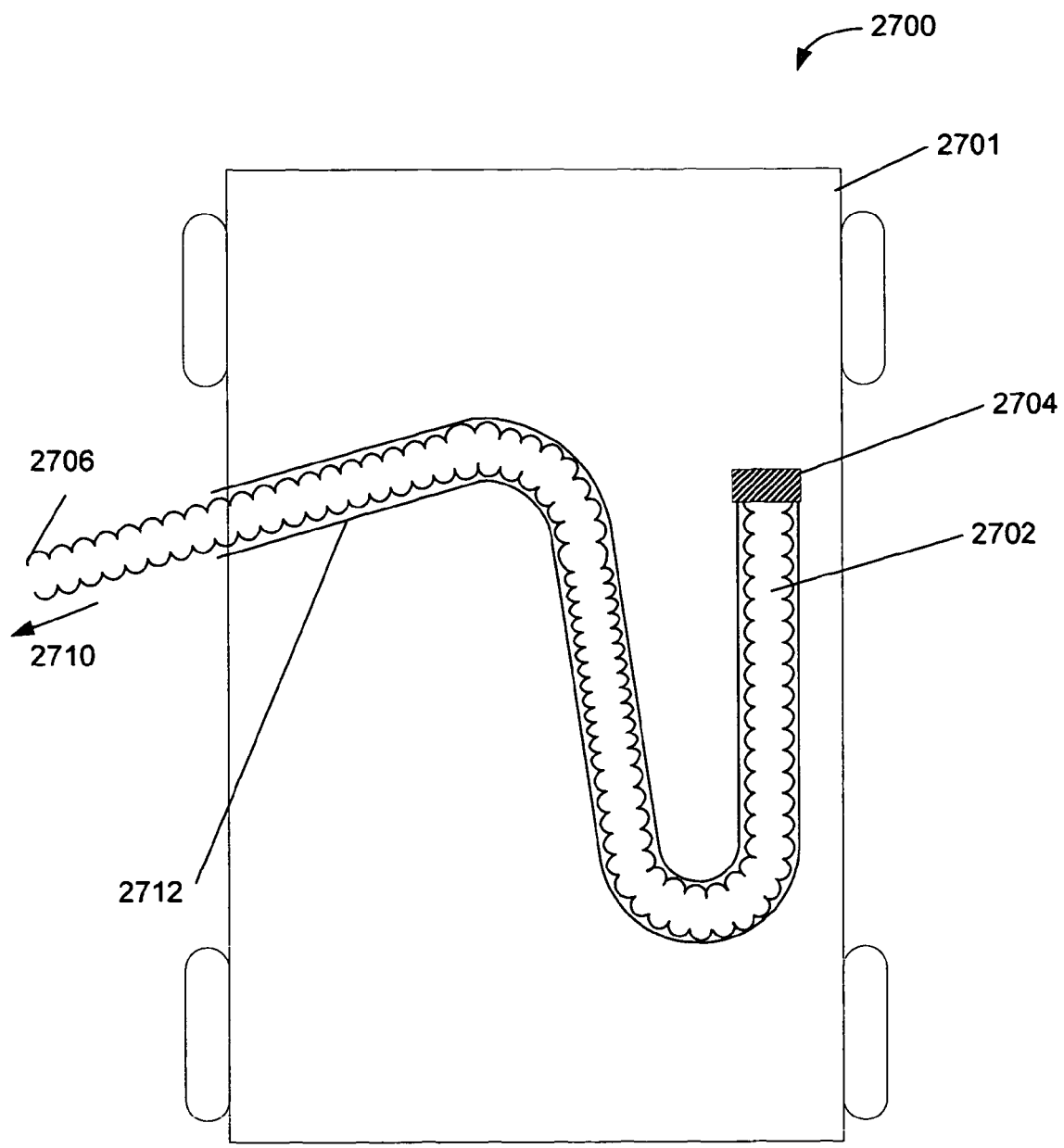

FIG. 27 illustrates one embodiment 2700 of the invention. 2701 is a top view of a vehicle. 2702 is an expandable hose shown in a partially extended state. One end of the hose is permanently attached at 2704 to, for example, a connection to valves which then connect to waste tanks located on the vehicle 2701. The other end of the expandable hose 2706 may be extended in the direction 2710. 2712 is a housing in which the hose 2702 may freely expand and contract. In the embodiment shown in FIG. 27 it will be noted that the hose is arranged in a serpentine pattern. This may allow the end of the hose 2706 to extend further as a hose 2702 of longer length may be stored as compared with one that directly crosses the vehicle 2701. One skilled in the art will recognize that other arrangements of the hose layout may also be made, such as, for example, a U-shaped pattern, etc. Additionally, the housing 2712 may extend beyond the sides of the vehicle 2701 as shown in FIG. 27. The housing 2712 may also attach anywhere along the path of the hose 2702, extending, for example, all the way to the fixed connection point at 2704.

FIG. 28 illustrates one embodiment of the invention where a valve handle 2804 is located on the side of the hose nozzle body 2802.

For ease of operation of a mechanism for extending and retracting a hose, a remote control may be used in one embodiment. For example, a wireless remote control may be used to control a pump which creates a pressure for extending the hose and a vacuum for retracting the hose. Such a remote control may be conveniently placed on a hose nozzle body, for example, in FIG. 28 is may be placed at the location indicated at 2806. In this way the user may extend and retract the hose while holding on to the nozzle. In other embodiments the remote control may be wired rather than wireless.

Additionally the remote control may operate the opening and closing of waste gate valves, flushing valve, and other valves, etc. In this way, the remote control may be used for controlling the evacuation of waste from a single control location.

Figure 29:
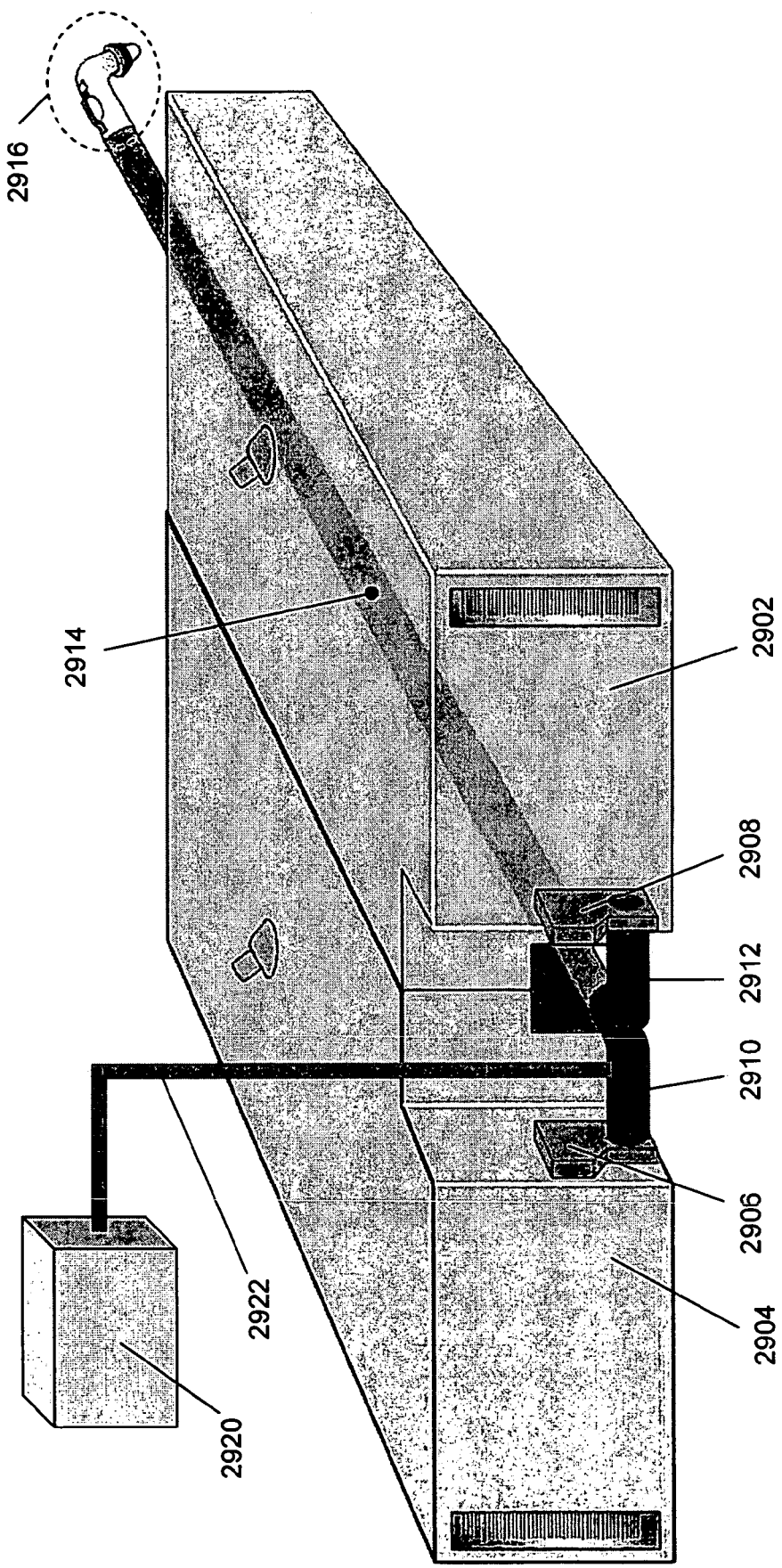
FIG. 29 illustrates one embodiment of the invention showing a source of pressure and/or vacuum.

FIG. 29 illustrates one embodiment of the invention showing a source of pressure and/or vacuum. Two tanks or containers 2902 and 2904 are shown. Here, on the passenger side of a RV are located valves 2906 and 2908 feeding into a plumbing system 2910 and 2912 respectively that join to a single hose 2914 which traverses across the tanks and emerges on another side, for example, the driver's side where it terminates in a nozzle 2916. By placing the valves on one side of a vehicle and the nozzle on another, a hose, such as 2914 may be a collapsible or extendible hose and thus in a closed or compacted form fit within the width of a vehicle and when extended may go to a portal some distance away from the vehicle. Also shown in FIG. 29 is a source of air pressure and/or a vacuum 2920. This source of air pressure and/or vacuum 2920 is in communication with 2910, 2912, 2914, and 2916 via a tube 2922. In one embodiment of the invention air pressure supplied by 2920 is communicated through 2922 supplying increased air pressure to 2910, 2912, and 2914 resulting in 2914 and the nozzle at 2916 extending outward from the vehicle. If 2920 creates a decrease in air pressure or a vacuum this is communicated to 2910, 2912, and 2914 via 2922 and this results in nozzle 2916 and the hose 2914 if already extended from the vehicle being retracted toward the vehicle. The source of the air pressure and/or vacuum 2920 may be conveniently located anywhere on the vehicle or supplied by connection to an external source, and the tubing 2922 may connect at any point along 2910, 2912, and 2914. The source of the air pressure and/or vacuum 2920 may be implemented in a variety of ways and no limitation in these implementations is implied by FIG. 29. For example 2920 may consist of an air compressor, valves, an air amplifier, and other associated devices which are capable of creating and supplying air pressure and/or a vacuum.

Figure 30:
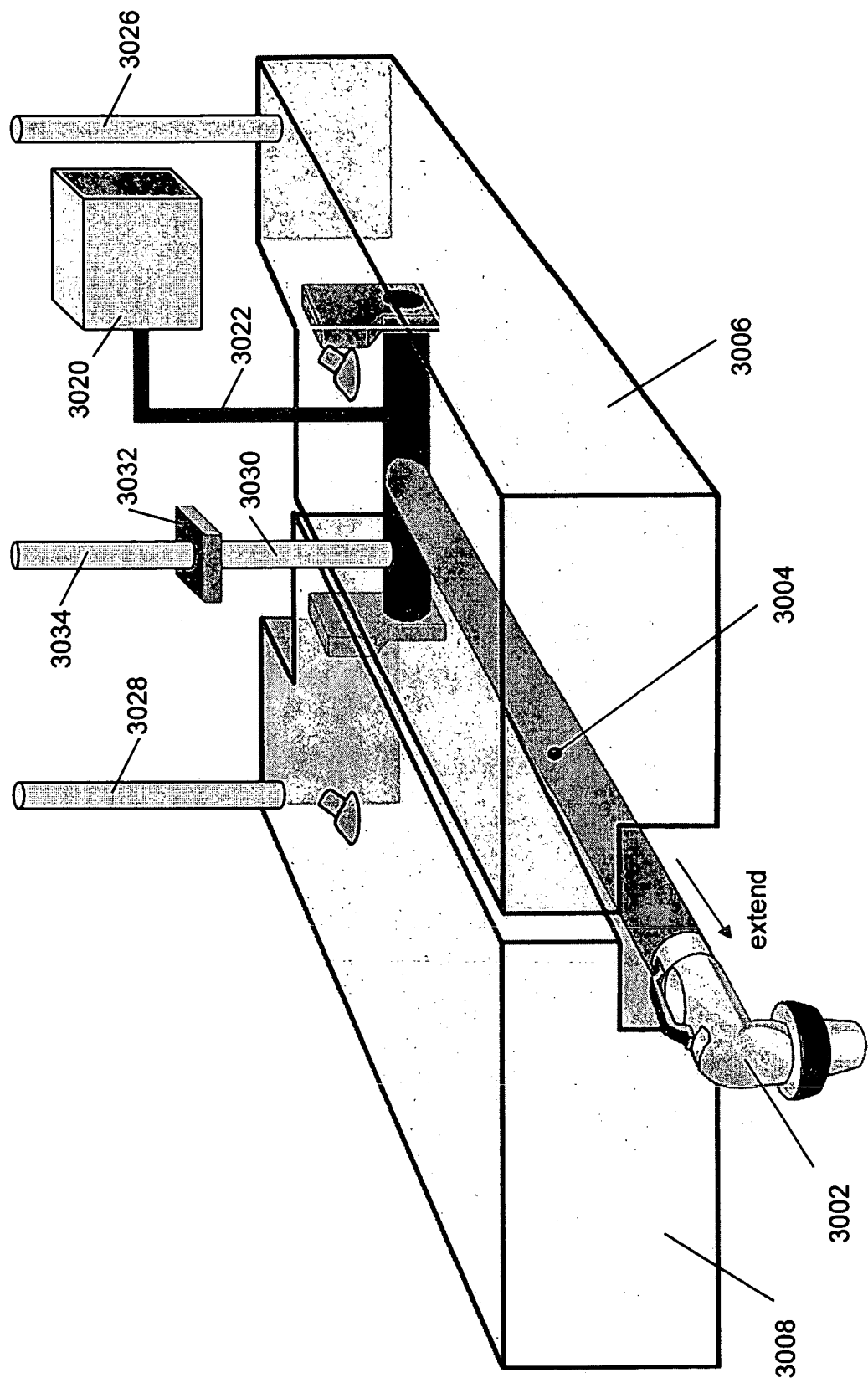
FIG. 30, FIG. 31, FIG. 32, FIG. 33, FIG. 34, FIG. 35, and FIG. 36, illustrate various embodiments of the invention.

FIG. 30 illustrates one embodiment of the invention showing venting tubes. Two tanks or containers 3006 and 3008 are shown. Here, on the driver side of a RV is the nozzle 3002 shown being extended from, for example, a collapsible hose 3004 which has increase air pressure supplied by unit 3020 and communicated via tube 3022. Venting tube 3026 is in communication with tank 3006 and venting tube is in communication with 3008. The venting tubes are useful or directing gasses that may form in the tanks upward into the atmosphere. These tubes which shown straight may also be curved and routed around other objects. The venting tubes are generally routed so as to exit near the top of a vehicle. Venting tube 3030 is in communication with 3004, and a valve 3032. Valve 3032 also is in communication with venting tube 3034. Valve 3032 controls whether gas entering 3030 is allowed to pass to venting tube section 3034. Valve 3032 is needed because, for example, when unit 3020 supplies via 3022 increased air pressure 3032 needs to be closed so that the increased air pressure goes through 3004 and thereby extends nozzle 3002. If valve 3032 were not closed but open then the increased their pressure supplied by 3020 communicated by 3022 would simply go through 3030, pass through the open valve 3032, the venting tube 3034, and go to the atmosphere. If the valve is open then the amount of increased their pressure to 3004 to extend the nozzle 3002 would be greatly decreased. Likewise when unit 3020 is creating a vacuum or decrease in air pressure communicated through 3022 to 3004 and retracting the nozzle 3002, valve 3032 needs to be closed so that the vacuum or decrease in pressure is not defeated by air flowing into 3034, through an open valve 3032, through 3030 back through 3022, and to the unit creating a vacuum 3020. When the hose 3004 and nozzle 3002 are retracted into the vehicle and no longer need to be extended or retracted the gases that may form in 3004 may be vented by having valve 3032 open. In this way gas will flow through 3030, through the open valve 3032, to the venting tube 3034 and into the atmosphere.

While the details of valve 3032 are not critical to the understanding of the invention, in practice, valve 3032 will likely be an electrically operated valve, for example, an electrically operated gate valve, a small ball valve, etc. This may be the same type of valve as shown in FIG. 29 as valves 2906 and 2908. The operation and control of the valve 3032 may be combined with the control and operation of extending and retracting the nozzle. For example, if the user goes to extend the nozzle valve, 3032 may close automatically, likewise when the user goes to retract the nozzle valve 3032 may also close. The control of valve 3032 may be in response to extension or retraction of the nozzle and/or in combination with increased air pressure and/or a vacuum generated by unit 3020.

Figure 31:
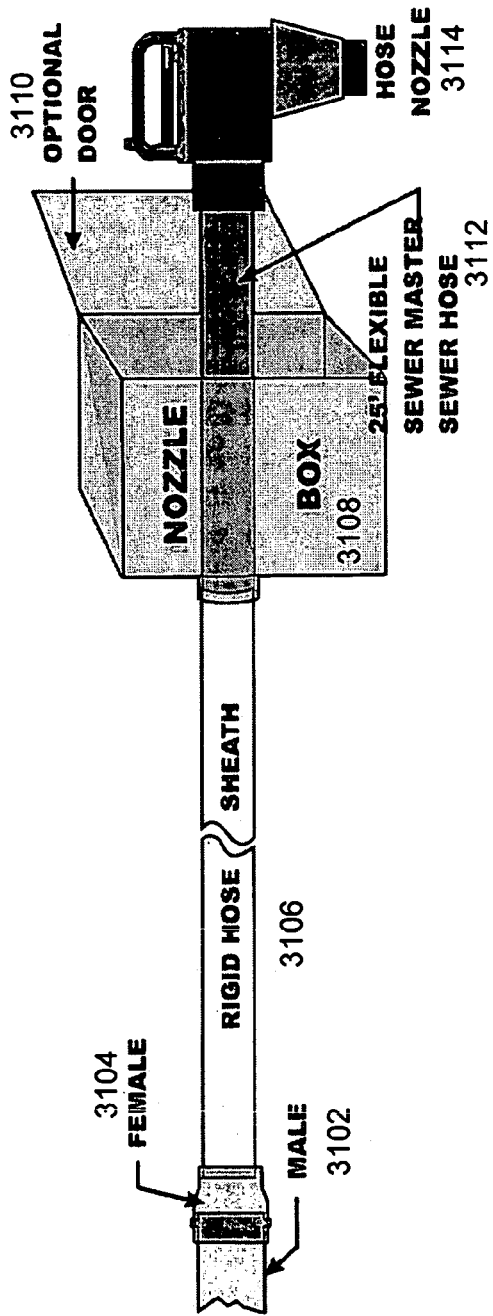

FIG. 31 illustrates one embodiment of the invention called Waste Master 1 (WM1). At 3102 is a male connector that may come from one of the valves which is connected to a waste tank, for example, a black water tank or grey water tank. That is, connection 3102 may represent, for example, referring to FIG. 10 a connection such as 1010 or 1012. Fitting 3104 is a female adapter which connects the male adapter 3102 to 3106 which is a rigid hose sheath the rigid hose sheath is used for guiding the flexible sewer hose illustrated at 3112. In this embodiment there is a nozzle box 3108 which houses the hose nozzle 3114 and has an optional door 3110. In operation when flexible sewer hose 3112 is in a retracted state the hose nozzle 3114 is within the nozzle box 3108. As previously described the flexible sewer hose 3112 allows the hose nozzle 3114 to be extended from the nozzle box 3108 and retracted back into the nozzle box 3108.

Figure 32:
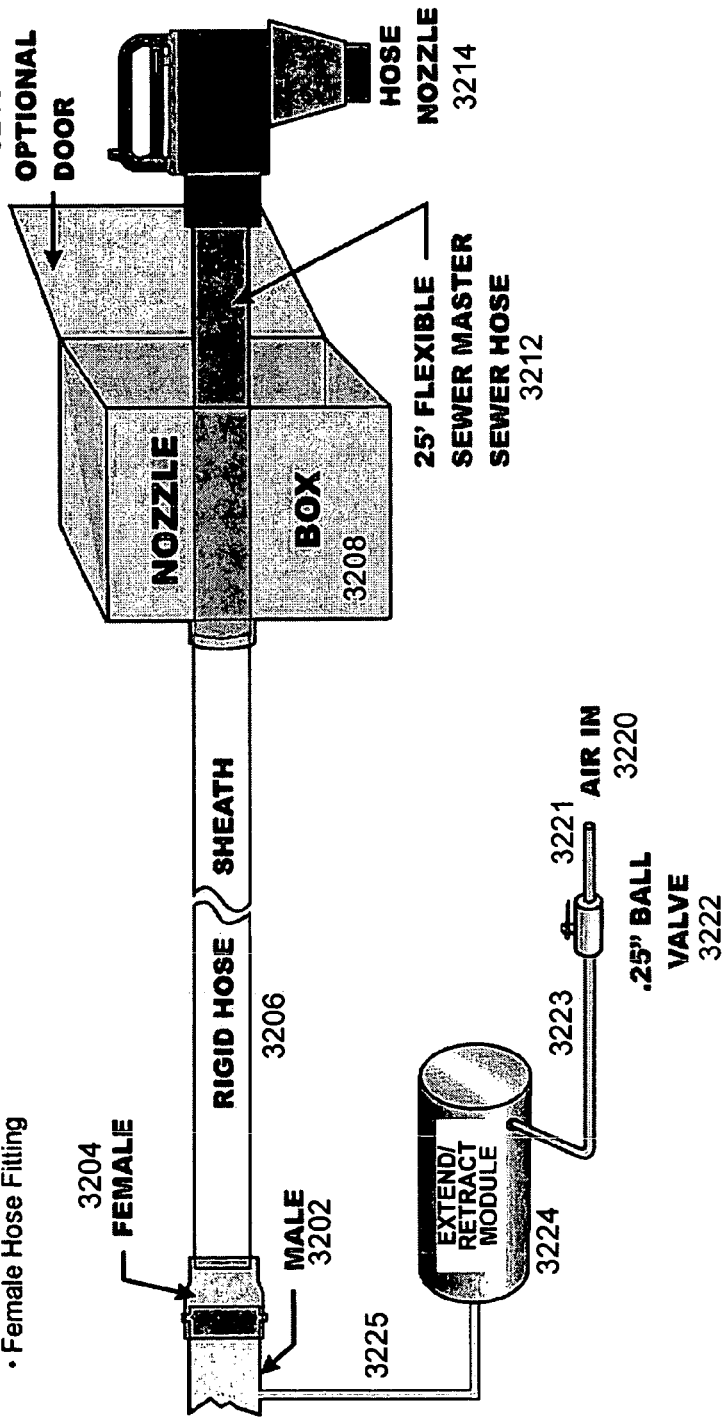

FIG. 32 illustrates one embodiment of the invention called Waste Master 2 (WM2). At 3202 is a male connector which may come from one of the valves which is connected to a waste tank, for example, a black water tank, or a grey water tank. That is, connection 3202 may represent, for example, referring to FIG. 10 a connection such as 1010 or 1012.

Fitting 3204 is a female adapter which connects the male adapter 3202 to 3206 which is a rigid hose sheath the rigid hose sheath is used for guiding the flexible sewer hose illustrated at 3212. This rigid sheath 3206 may represent, for example, referring to FIG. 27 the housing 2712 which guides the flexible hose 2702. In this embodiment there is a nozzle box 3208 which houses the hose nozzle 3214 and has an optional door 3210. In operation when flexible sewer hose 3212 is in a retracted state the hose nozzle 3214 is within the nozzle box 3208. As previously described the flexible sewer hose 3212 allows the hose nozzle 3214 to be extended from the nozzle box 3208 and retracted back into the nozzle box 3208. In this embodiment, the extension and retraction of the hose nozzle 3214 and flexible sewer hose 3212 is accomplished by an assisting mechanism. Connected to the male at 3202 is a tube 3225 which is in communication with the extend/retract module 3224. In this way a pressure and/or a vacuum created by 3224 may be communicated through tube 3225 which is connected to male 3202 and such increase or decrease in air pressure will be communicated to the flexible sewer hose 3212 and thus extend and/or retract hose nozzle 3214. The extend/retract module 3224 in this embodiment is connected via tube 3223 to a ball valve 3222 which is connected by tube 3221 to an air in source 3220. This air in source 3220 may be, for example, an air compressor, a storage tank of compressed air, etc. The compressed air may be supplied by an on-vehicle device or may be from an outside source, such as a compressed air connection to a pump at a waste station. Compressed air, as is well known, may be used to create a vacuum through what is called a Venturi tube. There are other approaches to creating a vacuum however, what is to be understood is that the extend/retract module 3224 may have a variety of components within it. For example, after the hose nozzle 3214 has been extended, liquid waste may be flowing through the male section 3202, the flexible sewer hose 3212, and out the nozzle at 3214 thus the extend/retract module 3224 is most likely to have a valve which shuts off communication with tube 3225 so that such waste does not enter the extend/retract module 3224.

Figure 33:
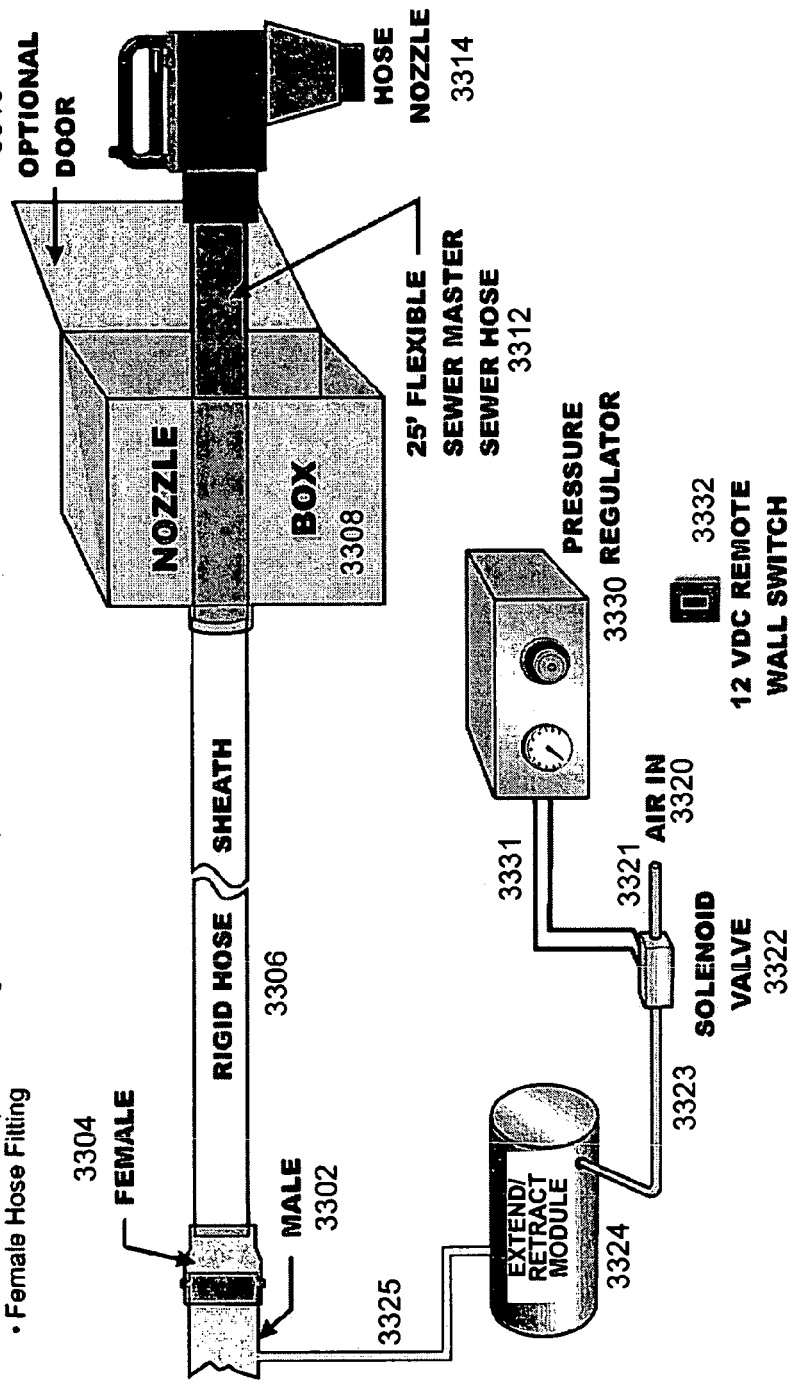

FIG. 33 illustrates one embodiment of the invention called Waste Master 3 (WM3). At 3302 is a male connector which may come from one of the valves which is connected to a waste tank, for example, a black water tank, or a grey water tank. That is, connection 3302 may represent, for example, referring to FIG. 10 a connection such as connecting to 1010 or 1012. Fitting 3304 is a female adapter which connects the male adapter 3302 to 3306 which is a rigid hose sheath the rigid hose sheath is used for guiding the flexible sewer hose illustrated at 3312. This rigid sheath 3306 may represent, for example, referring to FIG. 27 the housing 2712 which guides the flexible hose 2702. In this embodiment there is a nozzle box 3308 which houses the hose nozzle 3314 and has an optional door 3310. In operation when flexible sewer hose 3312 is in a retracted state the hose nozzle 3314 is within the nozzle box 3308. As previously described the flexible sewer hose 3312 allows the hose nozzle 3314 to be extended from the nozzle box 3308 and retracted back into the nozzle box 3308. In this embodiment, the extension and retraction of the hose nozzle 3314 and flexible sewer hose 3312 is accomplished by an assisting mechanism. Connected to the male at 3302 is a tube 3325 which is in communication with the extend/retract module 3324. In this way a pressure and/or a vacuum created by 3324 may be communicated through tube 3325 which is connected to male 3302 and such increase or decrease in air pressure will be communicated to the flexible sewer hose 3312 and thus extend and/or retract hose nozzle 3314. The extend/retract module 3324 in this embodiment is connected via tube 3323 to a solenoid valve 3322 which is connected by tube 3321 to an air in source 3320. This air in source 3320 may be, for example, an air compressor, a storage tank of compressed air, etc. The compressed air may be supplied by an on-vehicle device or may be from an outside source, such as a compressed air connection to a pump at a waste station. Compressed air, as is well known, may be used to create a vacuum through what is called a Venturi tube. There are other approaches to creating a vacuum however, what is to be understood is that the extend/retract module 3324 may have a variety of components within it. For example, after the hose nozzle 3314 has been extended, liquid waste may be flowing through the male section 3302, the flexible sewer hose 3312, and out the nozzle at 3314 thus the extend/retract module 3324 is most likely to have a valve which shuts off communication with tube 3325 so that such waste does not enter the extend/retract module 3324. In this embodiment solenoid valve 3322 is connected via wires 3331 to a pressure regulator 3330. In this way the air in at 3320 may be regulated to the extend/retract module 3324. The pressure regulator 3330 may be controlled, for example, by a remote switch shown at 3332. In this way the user may by flipping a switch such as 3332 may control the extension and retraction of the hose nozzle 3314.

Figure 34:
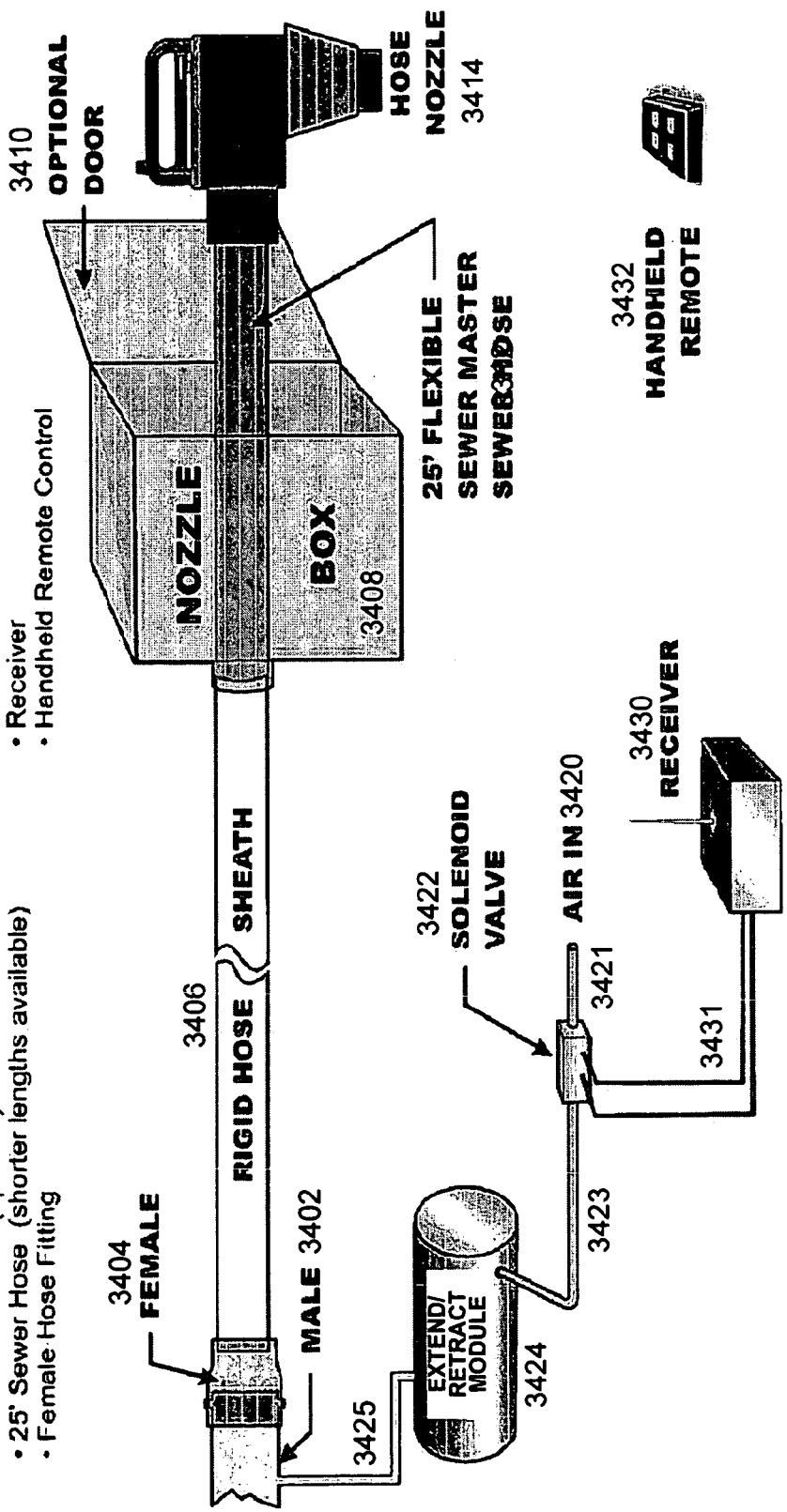

FIG. 34 illustrates one embodiment of the invention called Waste Master 4 (WM4). At 3402 is a male connector which may come from one of the valves which is connected to a waste tank, for example, a black water tank, or a grey water tank. That is, connection 3402 may represent, for example, referring to FIG. 10 a connection such as connecting to 1010 or 1012. Fitting 3404 is a female adapter which connects the male adapter 3402 to 3406 which is a rigid hose sheath the rigid hose sheath is used for guiding the flexible sewer hose illustrated at 3412. This rigid sheath 3406 may represent, for example, referring to FIG. 27 the housing 2712 which guides the flexible hose 2702. This sheath may be constructed in a variety of ways. For example, in one embodiment it may be PVC tube which is large enough in diameter to accommodate the flexible sewer hose. In this embodiment there is a nozzle box 3408 which houses the hose nozzle 3414 and has an optional door 3410. In operation when flexible sewer hose 3412 is in a retracted state the hose nozzle 3414 is within the nozzle box 3408. As previously described the flexible sewer hose 3412 allows the hose nozzle 3414 to be extended from the nozzle box 3408 and retracted back into the nozzle box 3408. In this embodiment, the extension and retraction of the hose nozzle 3414 and flexible sewer hose 3412 is accomplished by an assisting mechanism. Connected to the male at 3402 is a tube 3425 which is in communication with the extend/retract module 3424. In this way a pressure and/or a vacuum created by 3424 may be communicated through tube 3425 which is connected to male 3402 and such increase or decrease in air pressure will be communicated to the flexible sewer hose 3412 and thus extend and/or retract hose nozzle 3414. The extend/retract module 3424 in this embodiment is connected via tube 3423 to a solenoid valve 3422 which is connected by tube 3421 to an air in source 3420. This air in source 34320 may be, for example, an air compressor, a storage tank of compressed air, etc. The compressed air may be supplied by an on-vehicle device or may be from an outside source, such as a compressed air connection to a pump at a waste station. Compressed air, as is well known, may be used to create a vacuum through what is called a Venturi tube. There are other approaches to creating a vacuum however, what is to be understood is that the extend/retract module 3424 may have a variety of components within it. For example, after the hose nozzle 3414 has been extended, liquid waste may be flowing through the male section 3402, the flexible sewer hose 3412, and out the nozzle at 3414 thus the extend/retract module 3424 is likely to have a valve which shuts off communication with tube 3425 so that such waste does not enter substantially into the extend/retract module 3424. In this embodiment solenoid valve 3422 is connected via wires 3431 to a receiver 3430. In this way the air in at 3420 may be controlled to the extend/retract module 3424. The receiver 3430 may be controlled, for example, by a handheld remote shown at 3432. In this way the user may by operating the handheld remote 3432 may control the extension and retraction of the hose nozzle 3414. The handheld remote 3432 may be at any number of physical locations. For example, a handheld remote such as 3432 may be located on-board the vehicle, may be located behind an access panel near the nozzle, or may be mounted on the hose nozzle 3414 itself. Additionally, one or more handheld remotes are possible.

Figure 35:
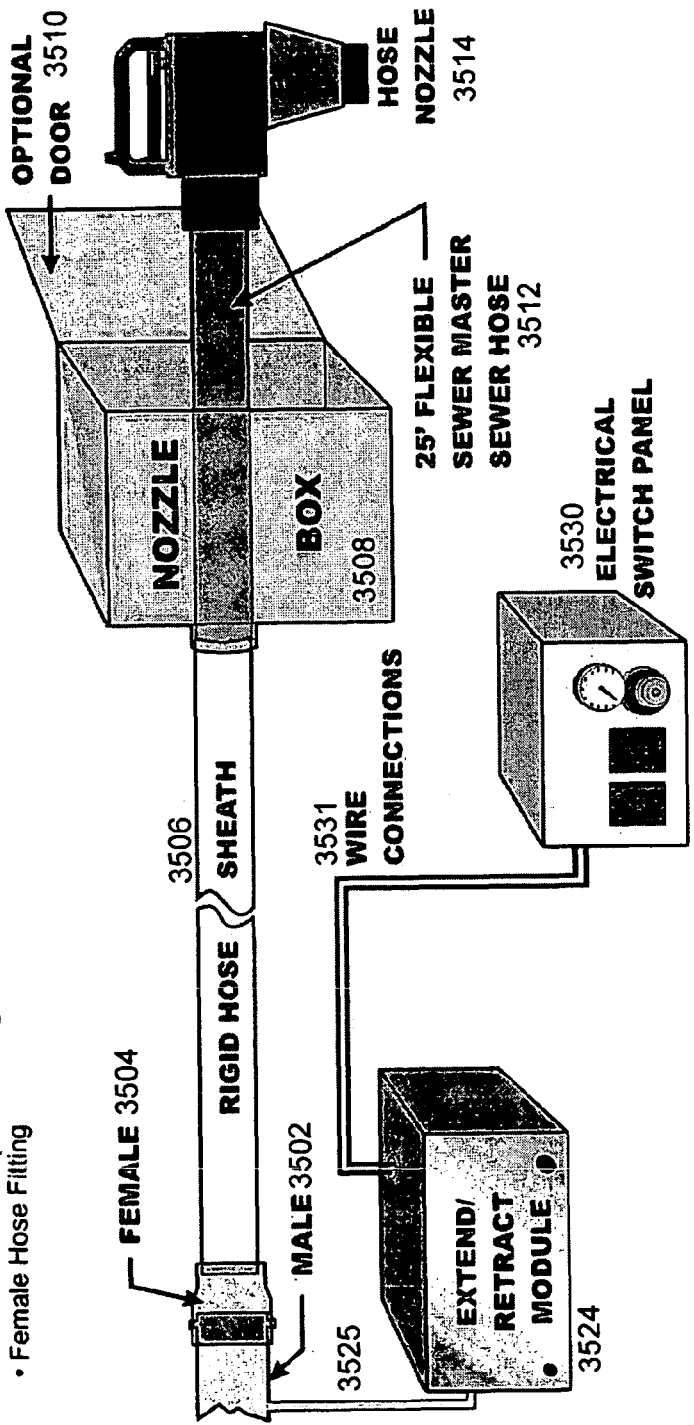

FIG. 35 illustrates one embodiment of the invention called Waste Master 5 (WM5). At 3502 is a male connector which may come from one of the valves which is connected to a waste tank, for example, a black water tank, or a grey water tank. That is, connection 3502 may represent, for example, referring to FIG. 27 a connection to 2704. Fitting 3504 is a female adapter which connects the male adapter 3502 to the flexible sewer hose 3512 which is located inside 3506 a rigid hose sheath used for guiding the flexible sewer hose illustrated at 3412 to the nozzle box 3508. This rigid sheath 3406 may represent, for example, referring to FIG. 27 the housing 2712 which guides the flexible hose 2702. This sheath may be constructed in a variety of ways. For example, in one embodiment it may be rectangular metal box-like structure that supports and guides the flexible sewer hose. In this embodiment there is a nozzle box 3508 which houses the hose nozzle 3514 and has an optional door 3510. In operation when flexible sewer hose 3512 is in a retracted state the hose nozzle 3514 is within the nozzle box 3508. As previously described the flexible sewer hose 3512 allows the hose nozzle 3514 to be extended from the nozzle box 3508 and retracted back into the nozzle box 3508. In this embodiment, the extension and retraction of the hose nozzle 3514 and flexible sewer hose 3512 is accomplished by a mechanism. Connected to the male at 3502 is a tube 3525 which is in communication with the extend/retract module 3524. In this way a pressure and/or a vacuum created by 3524 may be communicated through tube 3525 which is connected to male 3502 and such increase or decrease in air pressure will be communicated to the flexible sewer hose 3512 and thus extend and/or retract hose nozzle 3514. The extend/retract module 3524 in this embodiment generates the pressure/vacuum within a self contained unit. The extend/retract module 3524 is electrically controlled by electrical switch panel 3530 through wire connections 3531 to the extend/retract module 3524. In one embodiment, extend/retract module 3524, may have electrically operated valves, an air compressor, a venturi tube, and electronic controls.

Figure 36:
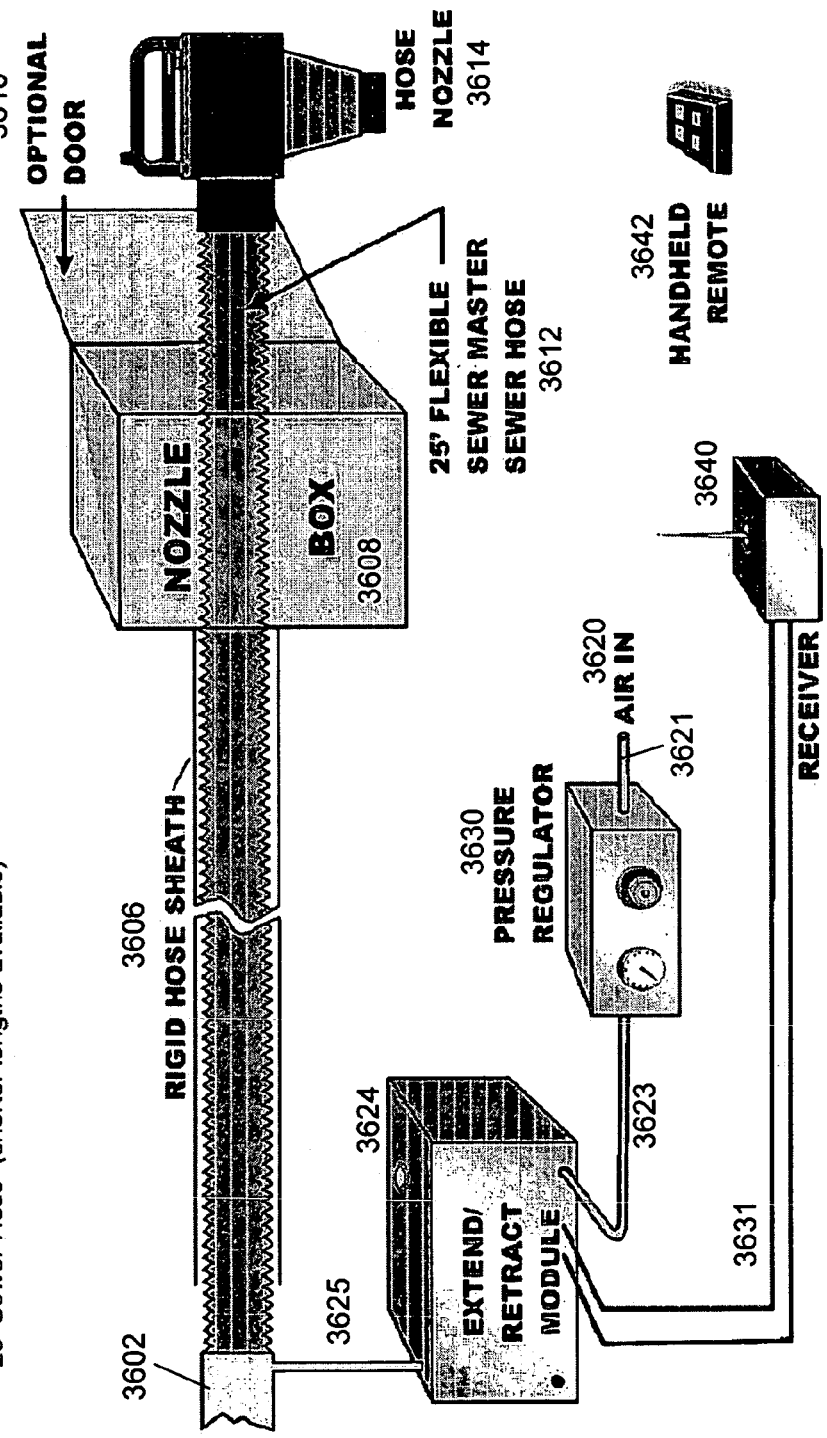

FIG. 36 illustrates one embodiment of the invention called Waste Master 6 (Wm6). At 3602 is a conduit which may have come from one of the valves which is connected to a waste tank, for example, a black water tank, or a grey water tank. That is, connection 3602 may represent, for example, referring to FIG. 10 a connection to 1010 or 1012. In this embodiment the flexible sewer hose 3612 which is located inside 3606 a rigid hose sheath used for guiding the flexible sewer hose is directly connected to conduit 3602. In this embodiment the rigid hose sheath 3606 is connected to the nozzle box 3608 but does not extend all the way to the conduit 3602. This is may be done so that access to the conduit 3602 and flexible hose 3612 joint may be easily accessible, for example, to inspect a clamp that may secure flexible hose 3612 to conduit 3602. The flexible hose 3612 in this embodiment is shown as a corrugated type hose extending from conduit 3602 all the way to a hose nozzle 3614. In other embodiments conduit 3602 may extend for example partway across the vehicle before making connection to a flexible sewer hose 3612. In this embodiment there is a nozzle box 3608 which houses the hose nozzle 3614 and has an optional door 3610. In operation when flexible sewer hose 3612 is in a retracted state the hose nozzle 3614 is within the nozzle box 3608. As previously described the flexible sewer hose 3612 allows the hose nozzle 3614 to be extended from the nozzle box 3608 and retracted back into the nozzle box 3608. In this embodiment, the extension and retraction of the hose nozzle 3614 and flexible sewer hose 3612 is accomplished by a mechanism. Connected to the conduit 3602 is a tube 3625 which is in communication with the extend/retract module 3624. In this way a pressure and/or a vacuum created by 3624 may be communicated through tube 3625 which is connected to conduit 3602 and such increase or decrease in air pressure will be communicated to the flexible sewer hose 3612 and thus extend and/or retract hose nozzle 3614. The extend/retract module 3624 in this embodiment generates the pressure/vacuum from a tube 3623 communicating a regulated pressure from pressure regulator 3630 which receives an air source from tubes 3621 communicated from air in 3620. The extend/retract module 3624 is electrically controlled by receiver 3630 through wire connections 3631 to the extend/retract module 3624. Additionally, receiver 3640 may be controlled by a handheld remote 3642. In one embodiment, extend/retract module 3624, may have electrically operated valves, a venturi tube, and electronic controls.

Figure 37:
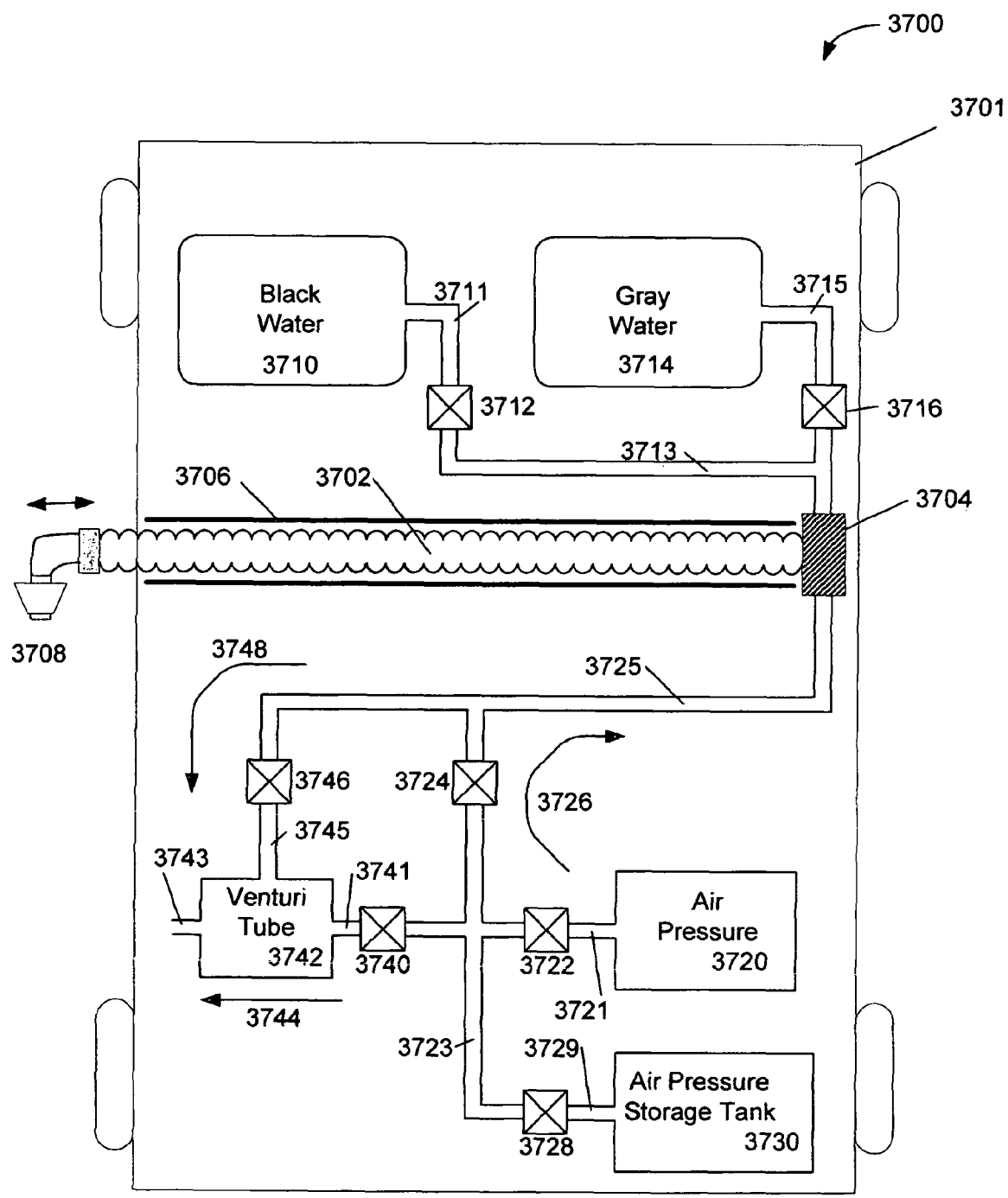
FIG. 37 illustrates one embodiment of the invention in block schematic form.

FIG. 37 illustrates one embodiment of the invention 3700 in block schematic form. During discharge of black water 3710 and/or gray water 3714, nozzle 3708 is extended from the vehicle 3701 and placed in contact with a receptacle. Extendible hose 3702 (guided by the sheath or shroud 3706) is attached to a joint 3704. 3704 has tubing 3713 connected to it which connects to a valve 3716, tubing 3715, and then to gray water 3714. Additionally tubing 3713 is connected to a valve 3712, through tubing 3711, to the black water tank 3710. These components; black water 3710, tubing 3711, valve 3712, tubing 3713, gray water 3714, tubing 3715, and valve 3716 are generally mounted in a position above 3704 or equal in elevation to 3704 so that gravity will assist in the emptying of the black water 3710 and/or the gray water 3714 through expandable hose 3702, through nozzle 3708 which is in contact with a receptacle.

Tubing 3725 is generally mounted above or higher in elevation (or routed higher) than the black water 3710 and/or gray water 3714 so the black water and/or gray water does not come in contact through tubing 3725 with valve 3724 or valve 3746. In practice, tubing 3713 which is used for conveying black water 3710 or grey water 3714 through connector 3704 to flexible hose 3702 will generally be larger in size than tubing 3725 which is conveying either an air pressure and/or a decrease in air pressure and/or a vacuum.

Now a discussion of emptying black water 3710 or gray water 3714 is disclosed. For sake of illustration, assume initially that expandable hose (or tube) 3702 attached to nozzle 3708 is in an extended position and nozzle 3708 is in contact with a receptacle for receiving waste. Assume further that all valves (3712, 3716, 3722, 3724, 3728, 3740, and 3746) are closed (or off), that is no air, vacuum, or fluids are allowed to pass through the valve. To empty black water 3710, valve 3712 would be opened. Now, black water 3710 flows through tubing 3711, open valve 3712, through tubing 3713, through connector 3704, through flexible tube 3702, to nozzle 3708 which has its valve open, and to the receptacle. When the black water tank is empty or emptied to the extent necessary, valve 3712 is shut off. A similar mode of operation is used to empty the gray water 3714. In this case valve 3712 is off, 3746 is off, 3724 is off (off denoting that the valve is closed so that gases and/or fluids may not flow through it) valve 3716 is opened and gray water 3714 flows through 3715 to open valve 3716, through 3704, through flexible tubing 3702, through nozzle 3708 to receptacle. Note that when valve 3746 and 3724 are closed no material may flow from tube 3725 through valve 3724 or 3746 to reach 3745 or 3723.

An explanation of the present invention for extending and retracting nozzle 3708 by using the flexible extendible and collapsible tubing 3702 within sheath 3706 will now be detailed. Flexible tubing 3702 is fixedly attached to a joint (or connection block) 3704 at one end and is attached to nozzle 3708 at the other end. Nozzle 3708 internally has a valve which may be opened or closed by the user. Assume initially that the nozzle 3708 is retracted and the nozzle valve is closed. This may be the case where, for example, the nozzle has been stowed away within a nozzle box on the side of a vehicle. The user would open an optional nozzle box door and then push an extend button. In one embodiment of the invention pressing the extend button may create the following sequence of events. Assume initially all valves (3712, 3716, 3722, 3724, 3728, 3740, and 3746) are closed. Upon pressing the button to extend the nozzle 3708 valve 3722 would open, valve 3724 would open, and air pressure at 3720 would flow through tube 3721, open valve 3722, and to 3723, through open valve 3724, through tubing 3725, through a joint 3704, and into the expandable hose 3702. Since nozzle 3708 has a valve which is closed the increased air pressure within tube 3702 will expand the tube 3702 by pushing it outward by expanding the accordion-like nature of the tube (hose) 3702. Thus air flow (air pressure) will generally follow the arrow as indicated by 3726.

Air pressure 3720 in this embodiment may be, for example, an air compressor, which is activated at the same time the valves 3722 and 3724 open. Alternatively in another embodiment, previously air pressure from 3720 may have been stored in an air pressure tank 3730. This would be possible if valves 3724 and 3740 are closed, valves 3722 and 3728 are open, and an air compressor located at 3720 operates and sends compressed air through 3721, open valve 3722, through tubing 3723, through open valve 3728, through 3729, and into the air pressure storage tank 3730. After sufficient air pressure had been stored, valve 3728 may be closed so as to retain the air pressure in the storage tank 3730.

Thus another way of extending the nozzle 3708 would be to have all valves closed except valve 3728 and valve 3724. In this case stored air pressure from tank 3730 would flow through tube 3729, open valve 3728, through tubing 3723, open valve 3724, through open valve 3725, through 3704 and into flexible tubing 3702. Please note that in this case valve 3746 is closed so no air pressure will flow from 3725 through the closed valve 3746. One of skill in the art will appreciate that the air pressure supplied by 3720 and/or 3730 may be generated on-board or supplied from an external source. For example, the air pressure storage tank 3730 in one embodiment may be the only source of air pressure. Air pressure storage tank 3730 may be filled up at, for example, a gas station where compressed air is available. Much like filling up a tire with air pressure the air pressure storage tank 3730 may be filled in a similar way. In this embodiment air pressure is used to extend tubing 3702 with the nozzle 3708 attached.

In the extended position a decrease in air pressure inside hose 3702 compared to outside air pressure or a vacuum is created in order to retract nozzle 3708 attached to flexible tubing 3702. Conceptually if all valves except 3746 are closed and a vacuum can be created to withdraw air as indicated by arrow 3748 then expandable hose 3702 will retract.

The creation of a vacuum is possible by using air pressure and having the air flow through a device called a Venturi tube 3742. The creation of a vacuum by using air pressure has long been known. The Venturi tube is named after the Italian physicist G B Venturi (1746-1822).

In this embodiment of the invention, a Venturi tube 3742 is used to create a vacuum which appears at tubing 3745 and is controlled by valve 3746. In one embodiment the creation of a vacuum is as follows: air pressure supplied from either the air pressure source 3720 and/or the air storage tank 3730 is communicated to tubing 3723 by open valve 3722 and/or 3728. Valve 3724 is closed so there is no air pressure flowing in direction indicated by 3726. With air pressure into 3723 valve 3740 is opened and this pressure is communicated to Venturi tube 3742 via tube 3741 and this air is exhausted out tube 3743. The Venturi tube 3742 when air is flowing in the indicated direction by arrow 3744 creates a vacuum in line 3745. If valve 3746 is now opened this vacuum or decrease in air pressure is communicated to 3725, through 3704, through 3702, and to the closed valve within the nozzle 3708. The extraction of air in the general direction indicated by arrow 3748 out through the Venturi tube exit 3743 effectively sucks in and causes to retract the expandable hose 3702.

One of skill in the art will realize that expandable hose 3702 may be extended and retracted by the use of increased air pressure entering the hose or air being evacuated (decrease air pressure) from the hose. When the hose is in the extended position, valves 3746 and 3724 are closed, then valves 3712 and/or 3716 may be opened to transfer waste and when waste transfer has been completed the valves 3712 and 3716 are closed, then valve 3746 may be opened to communicate a vacuum which pulls air from expandable hose 3702 in the direction indicated by 3748 and retracts the nozzle 3708.

One of skill in the art will appreciate that to extend and retract the nozzle 3708 via the flexible hose 3704 by using increased air pressure and a decrease in air pressure or a vacuum, it is necessary that tube 3702 and nozzle 3708 form a substantially air tight (gas tight) connection. That is, nozzle 3708 needs to have a valve which can be opened to allow fluids to pass, such as when dumping waste, and a closed position so that increased air pressure within 3702 will not escape from the nozzle, and a decrease in air pressure within 3702 is not defeated by air leaking into nozzle 3708. Such a valve within the nozzle has been illustrated in FIG. 1 that 104 and in FIG. 2 at 204. Additionally other embodiments of such a nozzle have been illustrated in other figures of the present invention. For example, a top operated control for the valve has been illustrated in the closed position in FIG. 5 and an open position in FIG. 6. Additionally a side operated valve control is indicated in FIG. 28, the valve being controlled by handle 2804.

While in practice, hose 3702 and nozzle 3708 are flushed with gray water or clear water to keep wastes inside hose 3702 to a minimum, there may be some waste present. Much like the venting tubes on the black water and gray water tanks, it is a good idea to vent any gases from decomposing waste in hose 3702 to the atmosphere. This may be accomplished in this example embodiment by having all valves closed except for 3746 being open. Any gases from 3702 would then flow in the direction indicated by arrow 3749 through tube 3725, open valve 3746, through tube 3745, through Venturi tube 3742, and through tube 3743 to the atmosphere, for example, from tube 3743 extending to the top of the vehicle 3701. Because of the physical construction of the Venturi tube gases may flow from 3745 to 3743 through the Venturi tube even with valve 3740 closed.

Figure 38:
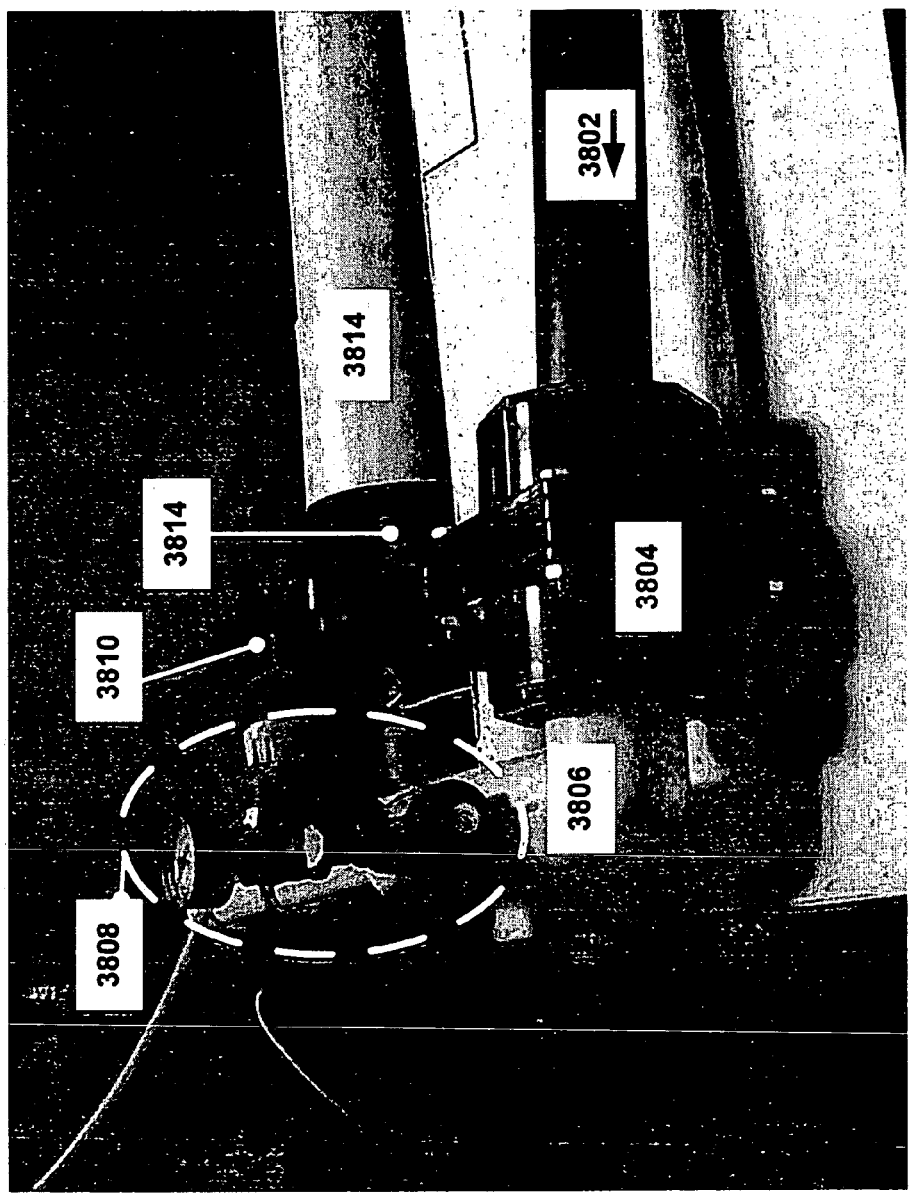
FIG. 38, FIG. 39, and FIG. 40 illustrate other embodiments of the invention.

FIG. 38 illustrates one embodiment 3800 of the invention. In this embodiment waste is entering via tube 3802 and flowing in the direction indicated by the arrow toward the valve 3804. Waste flowing from an open valve 3804 will flow through 3806, to another valve 3810, into the extendible hose 3814, and out toward a nozzle. Shroud or sheath 3814 is used to guide the extendible hose 3814. When waste valve 3804 is closed the mechanism shown at 3808 can create air pressure, or a decrease in air pressure or a vacuum. By creating an increase in air pressure at 3808 and opening valve 3810 this increasing air pressure is communicated to the flexible tube 3814 which will expand in length. Conversely by creating a vacuum at 3808 and having valve 3810 open, air will be extracted from 3814 the flexible tube and it will retract into and be guided by the sheath 3814.

Figure 39:
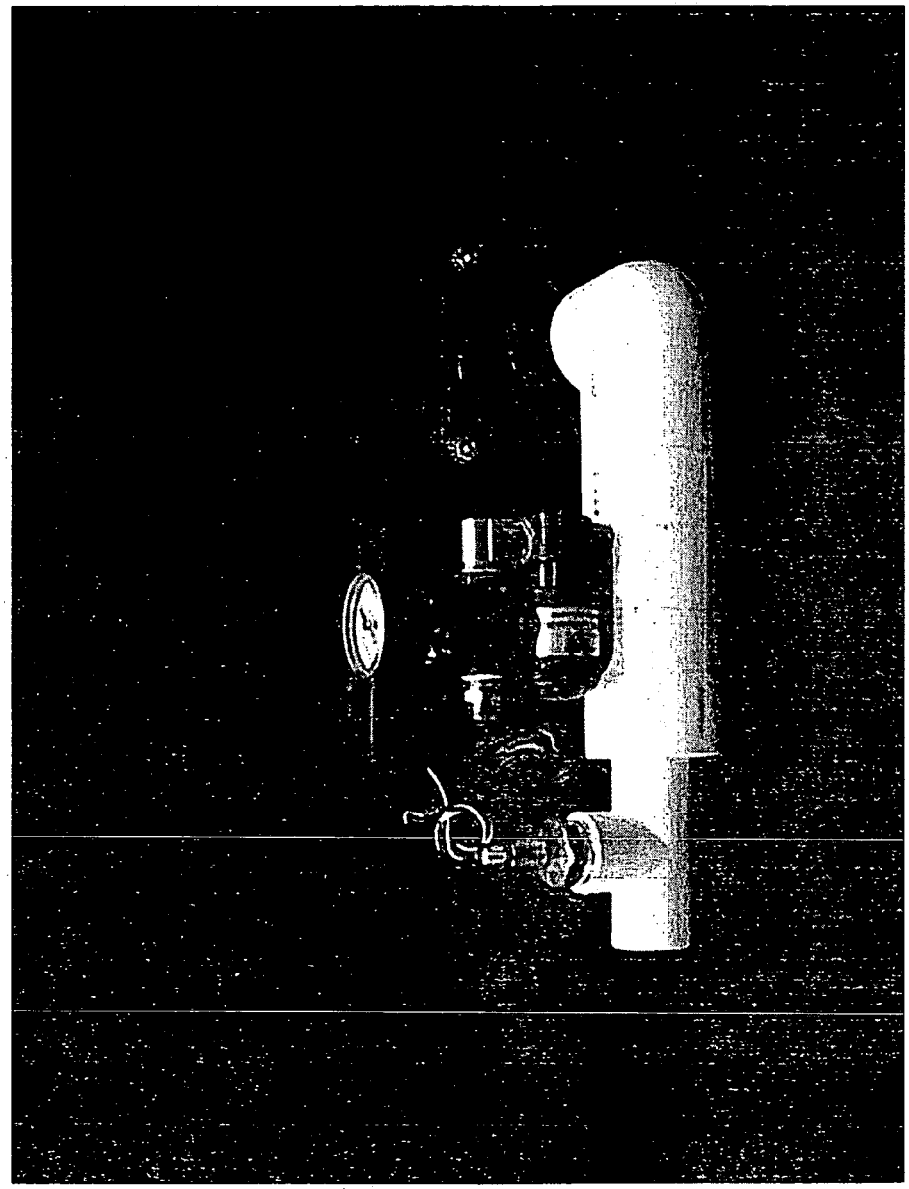
Figure 40:
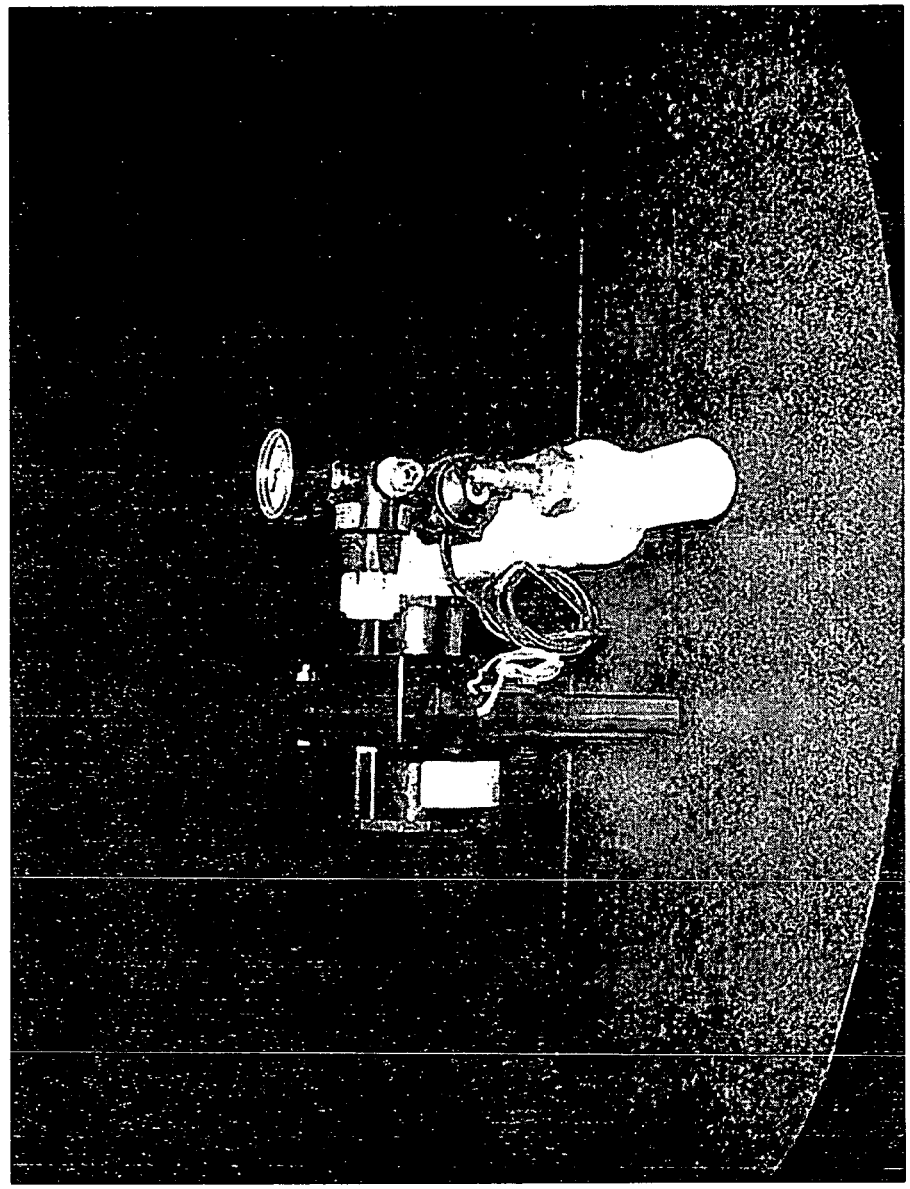

FIG. 39 and FIG. 40 illustrate other embodiments of the invention 3900 and 4000. In FIG. 39 and in FIG. 40 different views of a mechanism for controlling air pressure and decreased air pressure are shown.

Figure 41:
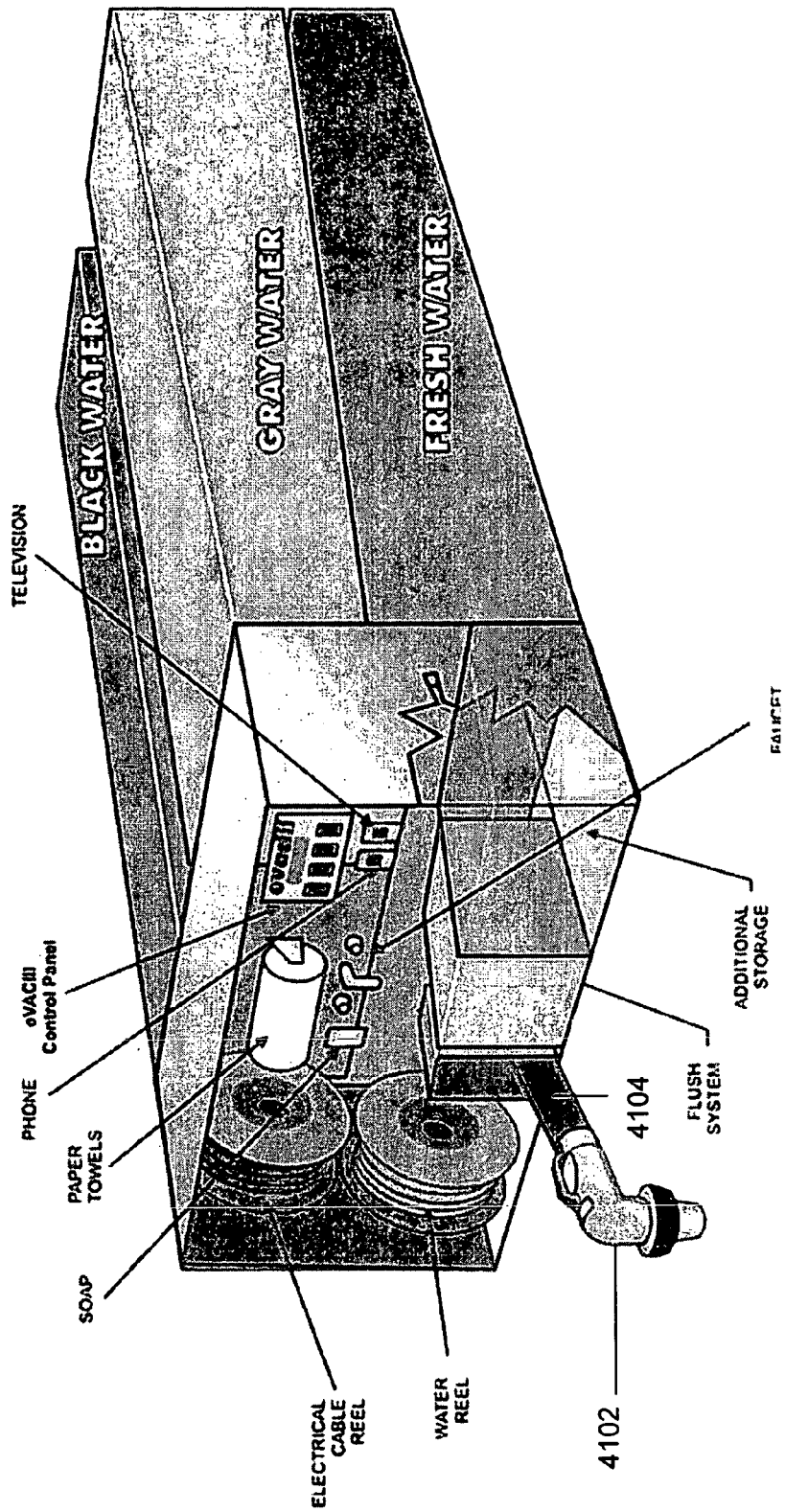
FIG. 41 illustrates another embodiment of the invention.

FIG. 41 illustrates one embodiment of the invention 4100 call Service Bay Master. In this embodiment the nozzle 4102 the expandable hose 4104 may be seen in relation to other accessories as denoted by text and arrows pointing to various items. Additionally black water, gray water, and fresh water or clear water tanks are shown. This assembly may be placed on the underside of a vehicle with access available on the side of the vehicle. For example referring to FIG. 14 the assembly indicated by 1404 may be Service Bay Master 4100.

One of skill in the art will appreciate that many other embodiments of the invention are possible. For example, one embodiment of the invention not illustrated involves the transfer of a debit and/or a credit. This may be, for example, a charge that is associated with the dumping of waste, etc.

As previously mentioned, the extendible/retractable hose may be expanded by air pressure and contracted by vacuum. One skilled in the art recognizes that there are a variety of methods and means for creating air pressure and reduced air pressure, i.e. creating a vacuum. For example an air compressor, an air pump, and a fan or blower may be used for increasing air pressure. A vacuum may be created by a vacuum pump, a fan or blower exhausting from out a region, etc. Additionally, it is possible to use compressed air or air under pressure to also create a vacuum. For example, a venturi, a vortex tube, an air amplifier, and a line vac can all create reduced air pressure (a vacuum).

It is to be understood that references to "hose," "sewer hose," "collapsible," "extendible," "retractable," "extendible conduit," "bellows", or similar terms with respect to a hose or conduit is a term referring to a hose, tubing, or flexible hose that by its construction allows for extension in length and a return to a smaller length than when extended (contraction). Various such devices exist. For example, a hose that is corrugated may be collapsible and expandable in length. One such flexible hose is disclosed by Akedo et al. in U.S. Pat. No. 6,024,134 (see FIG. 5). Other hoses may also be used for this purpose. The extended or contracted state may be the default resting state. For example in one embodiment the hose may be naturally in a compressed state and need forces to extend it. In another embodiment the hose may be in an extended state and need forces to retract or compress it. In yet another embodiment, the hose may not have any natural state, i.e. it may need a force to extend it, at which point no additional force is needed to maintain it at its length, however additional force may be needed to compress or contract it, at which point no additional force is needed to maintain it at this compressed state. One such example is aluminum exhaust tubing for a clothes dryer. These type of collapsible and expandable in length hoses are known by various names such as, but not limited to, corrugated, accordion, bellows type construction, convoluted, helical coil, etc. What is to be appreciated is that the hose can extend and contract in length.

It is to be understood that terms such as expandable, extendible, retractable, compressible, collapsible, and the like refer to the extension and contraction in length, rather than in diameter, of a hose or conduit. Additionally, terms such as axially, longitudinally, and the like refer to the length direction of a hose or conduit rather than the diameter dimension.

As used in this description, "one embodiment" or "an embodiment" or similar phrases denotes that the feature(s) being described are included in at least one embodiment of the invention. References to "one embodiment" in this description do not necessarily refer to the same embodiment; however, neither are such embodiments mutually exclusive. Nor does "one embodiment" imply that there is but a single embodiment of the invention. For example, a feature, structure, act, etc. described in "one embodiment" may also be included in other embodiments. Thus, the invention may include a variety of combinations and/or integrations of the embodiments described herein.

Use of the descriptive term "driver's side", "passenger's side", or the like is to be understood as being used for more conveniently describing the relationship of the components of the invention, rather than an absolute position. For example, the driver's side of the vehicle in the United States is understood to be on the left side of a vehicle if one is sitting in the vehicle. However, in the United Kingdom, the driver's side is considered to be on the right side of the vehicle. Thus what is to be appreciated is that the extendable hose as described in various embodiments of the invention is attached at one end (generally on one side of the vehicle) and extends from the other end (generally from that side or another side).

Use of the descriptive term "vehicle", "mobile vehicle", "RV", or the like is to be understood as being used for more conveniently describing the present invention and not as a limitation. For example, vehicle is to include, but is not limited to, buses, trucks, trailers, mobile kitchens, emergency mobile hospitals, and other mobile facilities that may store waste or liquids, such as trains, planes, ships, etc.

Thus, a waste evacuation system for a vehicle has been described.

What is claimed is:

1. A fluid transfer system comprising:
   one or more tanks capable of holding said fluid;
   an extendible and retractable hose for transferring said fluid, wherein said extendible and retractable hose has two ends, a first end in fluid communication with said one or more tanks, and a second end having an attached nozzle, said extendible and retractable hose extendible so said nozzle is capable of being in fluid communication with a receiving receptacle for transfer of said fluid, and;
   wherein said second end is extended and retraced in response to gas pressure inside of said extendible and retractable hose.

2. The system of claim 1 wherein said extended second end of said extendible and retractable hose is retractable in response to gas pressure inside of said extendible and retractable hose.

3. The system of claim 1 wherein said fluid is a liquid.

4. The system of claim 3 wherein said liquid is selected from the group consisting of water, liquid waste, black water, grey water, effluent, and water containing waste materials.

5. The system of claim 1 wherein said system is located on a vehicle.

6. The system of claim 1 wherein said gas is air.

7. The system of claim 1 wherein said gas pressure is above local atmospheric pressure for extending said extendible and retractable hose.

8. The system of claim 7 wherein said above local atmospheric pressure is supplied from a pressurized gas tank.

9. The system of claim 1 wherein said gas pressure is below local atmospheric pressure for retracting said extendible and retractable hose.

10. The system of claim 9 wherein said below local atmospheric pressure is generated by a Venturi tube type device driven from a pressurized gas tank.

11. The system of claim 1 further comprising venting ports selected from the group consisting of venting ports for said one or more tanks, and venting port for said extendible and retractable hose.

12. The system of claim 1 wherein said extendible and retractable hose is selected from the group consisting of an axially extendible and compressible hose, an accordion-type construction hose, an expandable and collapsible type hose, a hose having a spirally wound wall, a flexible hose having adjacent transverse accordion pleats, and a longitudinally extensible and compressible hose.

13. The system of claim 1 wherein said gas pressure is supplied from a pressurized gas tank.

14. A vehicle waste transfer system comprising:
one or more tanks capable of holding said waste;
an extendible and retractable hose for transferring said waste, wherein said extendible and retractable hose has two ends, a first end in communication with said one or more tanks, and a second end having an attached nozzle, said extendible and retractable hose extendible so said nozzle is capable of transferring said waste a distance from said vehicle;
wherein said second end is extended in response to gas pressure applied to the inside of said extendible and retractable hose.

15. The system of claim 14 wherein said first end in communication with said one or more tanks is through one or more valves connected between said one or more tanks and said first end.

16. The system of claim 14 wherein said gas pressure is supplied from a tank of compressed air.

17. The system of claim 16 wherein said tank of compressed air has in input port and an output port, said input port in communication with a one-way valve for receiving air, and said output port in communication with a one-way valve for supplying air.

18. The system of claim 17 wherein said source of receiving air is selected from the group consisting of an on-vehicle air compressor, and an external connector for connection to a external source of compressed air.

19. The system of claim 14 further comprising a supporting member attached to said vehicle for supporting said extendible and retractable hose.

20. The system of claim 19 wherein said supporting member is a tube larger in diameter than diameter of said extendible and retractable hose.

21. The system of claim 19 further comprising a storage container for said extendible and retractable hose when in a retracted state.

22. A system for transferring liquid waste comprising:
one or more tanks capable of holding said liquid waste;
an extendible and retractable hose for transferring said liquid waste, wherein said extendible and retractable hose has two ends, a first end for receiving liquid waste from said one or more tanks, and a second end having an attached nozzle, said extendible and retractable hose extendible a distance from said vehicle so said nozzle is capable of transferring said received liquid waste;
wherein said second end is extendible and retractable in response to gas pressure applied to the inside of said extendible and retractable hose.

23. The system of claim 22 further comprising a support device through which said extendible and retractable hose may extend and retract without substantial resistance.

24. The system of claim 22 wherein said extendible and retractable hose when transferring said liquid waste has said second end at an equal or lower elevation than said first end.

* * * * *